(12) United States Patent
Suzuki et al.

(10) Patent No.: US 6,404,103 B1
(45) Date of Patent: Jun. 11, 2002

(54) ULTRASONIC MOTOR AND ELECTRONIC APPARATUS HAVING ULTRASONIC MOTOR

(75) Inventors: Kenji Suzuki; Masao Kasuga; Akihiro Iino; Takayuki Kosaka, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/703,148

(22) Filed: Oct. 31, 2000

(30) Foreign Application Priority Data

Nov. 1, 1999 (JP) .......................................... 11-311550
Oct. 10, 2000 (JP) ........................................ 2000-309534

(51) Int. Cl.[7] ............................................... H02N 2/00
(52) U.S. Cl. ........................ 310/323.01; 310/323.02; 310/316.01
(58) Field of Search ..................... 310/316.01, 323.01, 310/323.02, 323.04, 323.16

(56) References Cited

U.S. PATENT DOCUMENTS

| 5,237,237 A | * | 8/1993 | Ueda et al. | 310/323.13 |
|---|---|---|---|---|
| 5,247,220 A | * | 9/1993 | Miyazawa et al. | 310/323.01 |
| 5,592,041 A | * | 1/1997 | Kasuga et al. | 310/316.01 |
| 5,619,089 A | * | 4/1997 | Suzuki et al. | 310/313.13 |
| 5,831,370 A | * | 11/1998 | Sugaya | 310/323.01 |
| 6,104,121 A | * | 8/2000 | Suzuki et al. | 310/323.04 |
| 6,218,767 B1 | * | 4/2001 | Akada et al. | 310/323.02 |

* cited by examiner

Primary Examiner—Thomas M. Dougherty
(74) Attorney, Agent, or Firm—Adams & Wilks

(57) ABSTRACT

An ultrasonic motor with increased output power per unit volume is provided by simultaneously driving all of a plurality of polarized segments of a piezoelectric element having a circular disk shape and divided into a multiple of four polarized segments in a circumferential direction. Projections are provided at upper faces of the polarized segments of the piezoelectric element and spaced apart by an odd number of polarized segments. Polarities of adjacent polarized segments are the same and polarities of adjacent pairs are reverse to each other. A first polarized segment group comprises every other polarized segment and a second polarized segment group comprises the remaining polarized segments. By selecting whether phases of alternating voltages supplied to the first and second polarized segment groups are the same or are 180 degrees out of phase, the direction of the motor is determined.

20 Claims, 21 Drawing Sheets

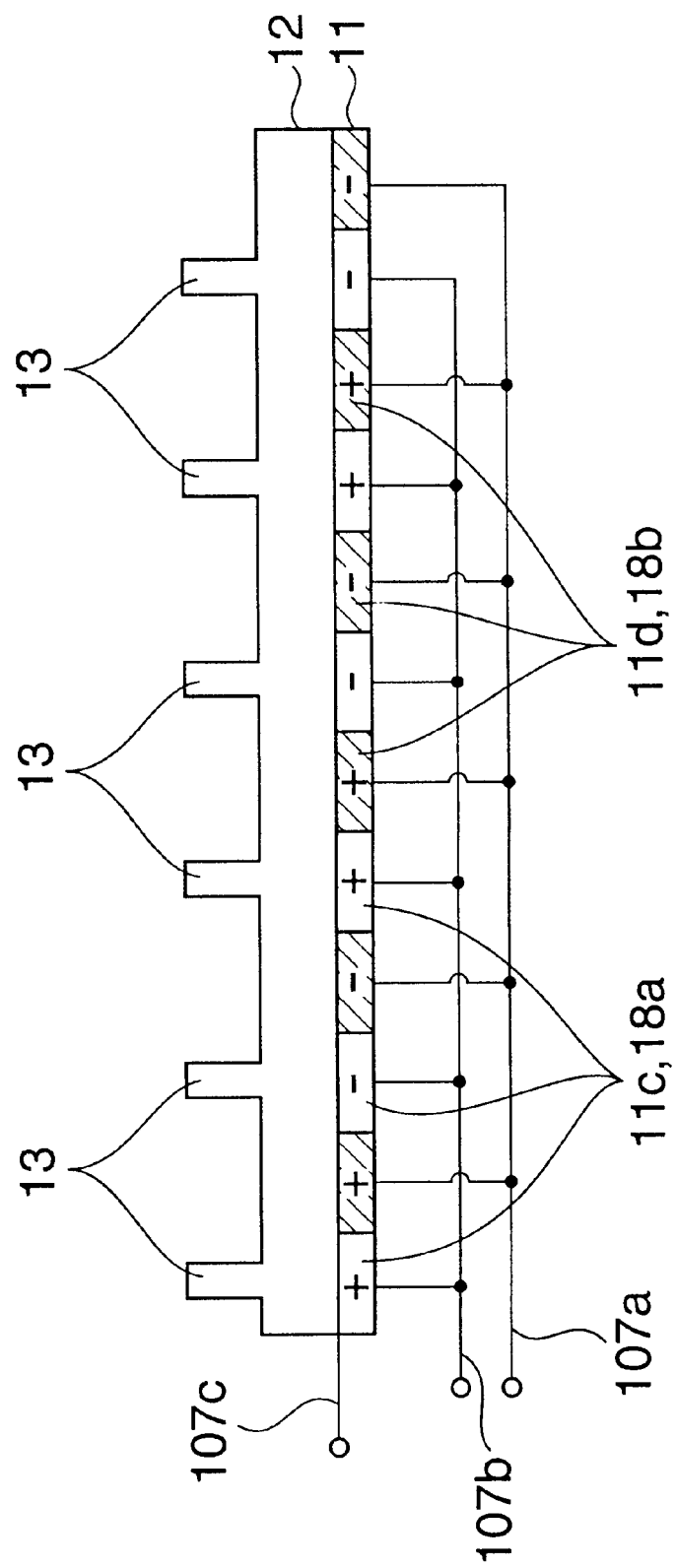

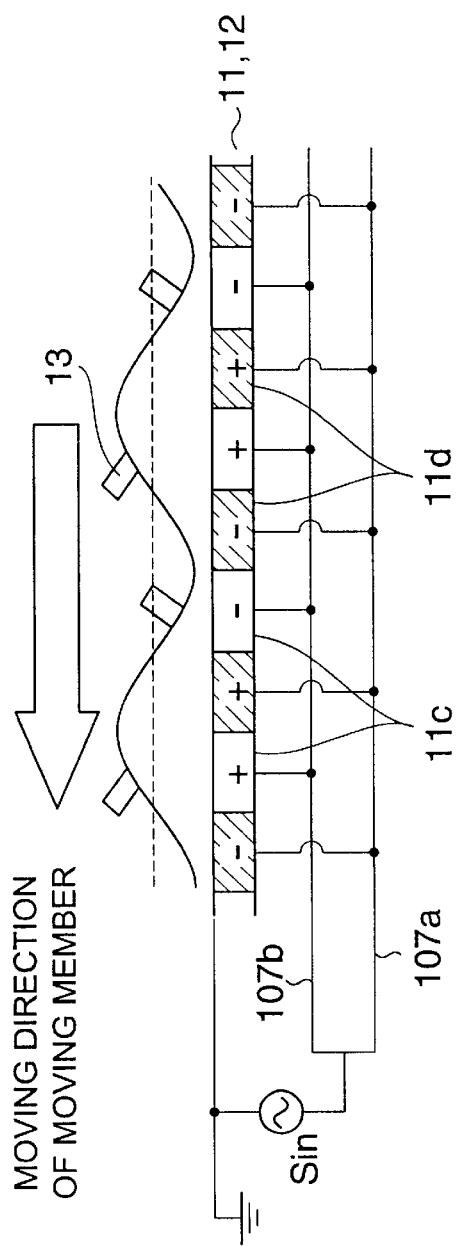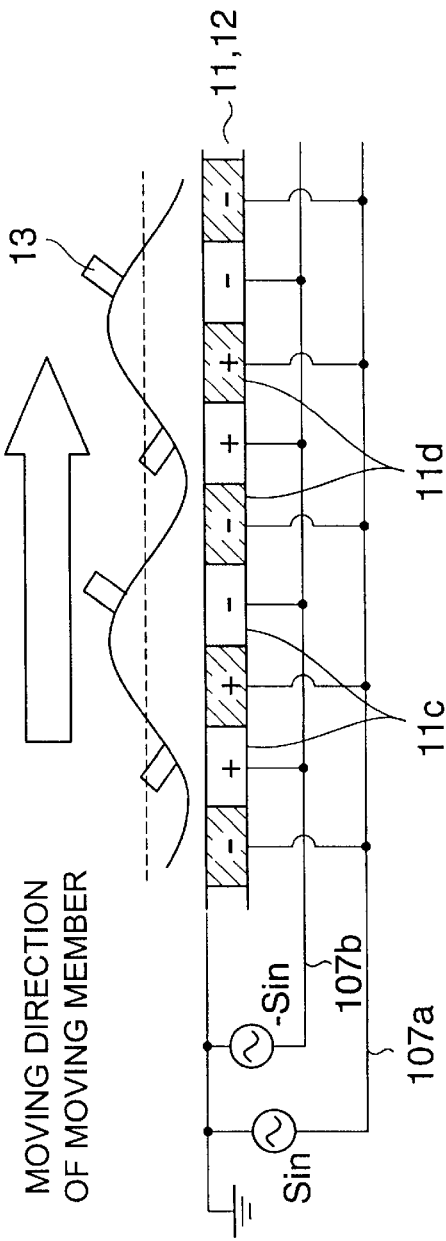

ULTRASONIC MOTOR AND ELECTRONIC APPARATUS HAVING ULTRASONIC MOTOR

BACKGROUND OF THE INVENTION

1. Field of the Invention

The present invention relates to an ultrasonic motor and an electronic apparatus using the ultrasonic motor, particularly to an ultrasonic motor increasing an output per unit volume and an electronic apparatus using the ultrasonic motor.

2. Description of the Related Art

In recent times, in the field of micromechanics, attention has been directed to realizing an ultrasonic motor utilizing flexing oscillation generated in a piezoelectric member applied with drive voltage such as an alternating current voltage as a power source thereof.

As an example of a conventional ultrasonic motor, there is provided, for example, an ultrasonic motor 100 of a circular plate type shown in FIG. 20 through FIG. 23B.

As shown by an outline sectional view of FIG. 20, the ultrasonic motor 100 is generally constituted by a piezoelectric element 101 in a circular plate shape, an oscillator 102 made of a metal as an elastic member adhered onto the piezoelectric element 101, a plurality of projections 103 erected integrally at an upper face of the oscillator 102 as the elastic member, enlarging displacement of oscillation of the piezoelectric element 101 and taking out an output thereof, a rotor 104 which is brought into contact with the projections 103 from above and rotating by way of frictional force by movement of the projections 103, a support shaft 105 penetrating centers of the piezoelectric element 101 and the oscillator 102, holding the piezoelectric element 101 and the oscillator 102 above a base plate 110 and playing a role of guiding rotation of the rotor 104 and a spring 106 for depressing a rotational center of the rotor 104 downwardly to thereby ensure predetermined contact pressure between the rotor 104 and the projections 103. In this case, the piezoelectric element 101 is applied with drive voltage via lead wires 107a and 107b crawling on the base plate 110.

According to the piezoelectric element 101, as shown by an outline upper view of FIG. 21, PZT which is a well-known piezoelectric material, is molded in a circular plate shape and is provided with a hole 101c for passing the rotating shaft 105 at its center and which is divided into six divisions in a circumferential direction and the divisions are polarized such that polarizing directions thereof are reverse to each other and each of the divisions is equally divided into two. As a result, there is constructed a constitution in which there are arranged a total of 12 pieces of polarized portions 101a polarized in positive polarity and polarized portions 101b polarized in polarity reverse thereto alternately at every two pieces thereof. Signs of plus (+) and minus (−) in the drawing represent polarities of polarization and in this case, polarizing treatment is carried out in the thickness direction of the piezoelectric element 101, plus (+) indicates that the polarizing treatment is carried out in a direction from the piezoelectric element 101 toward the oscillator 102 and minus (−) indicates that the polarizing treatment is carried out conversely in a direction from the oscillator 102 toward the piezoelectric element 101.

Here, as shown by schematic views of FIG. 21 and FIG. 22, the projections 103 are provided at every other boundaries of the polarized portions.

Further, the piezoelectric element 101 is provided with an electrode 108a connected to the lead wire 107a and an electrode 108b connected to the lead wire 107b as electrodes for inputting drive voltage. The electrode 108a covers every other polarized portions, mentioned above, further, the electrode 108b covers every other polarized portions reversely to the electrodes 108a.

That is, when drive voltage is inputted to the electrode 108a, as shown by FIG. 23A, the piezoelectric element 101 is generated with a standing wave such that central portions of the respective polarized portions covered by the electrode 108a constitute antinodes. The projections 103 are disposed at every other intermediaries of the antinodes and nodes of the standing wave. Therefore, head portions of all of the projections 103 draw a locus in a circular arc shape and accordingly, in this case, as shown by an arrow mark in FIG. 23A, the rotor 104 is rotated in one direction. At this occasion, the projections 103 play a role of amplifying oscillation of the standing wave.

Further, when drive voltage is inputted to the electrode 108b, as shown by FIG. 23B, the piezoelectric element 101 is generated with a standing wave such that central portions of the respective polarized portions covered by the electrode 108b constitute antinodes and accordingly, the head portions of all of the projections 103 draw a locus in a circular arc shape in a reverse direction. Therefore, in this case, as shown by an arrow mark in FIG. 23B, the rotor 104 is rotated in a reverse direction.

However, according to the above-described ultrasonic motor 100, in order to switch the rotational direction, the ultrasonic motor is driven by selecting an electrode for applying the drive voltage from the electrode 108a or the electrode 108b. Therefore, not all of the polarized portions provided in the piezoelectric element 101 but a half thereof are driven.

That is, all of the piezoelectric elements 101 are not utilized simultaneously and accordingly, an output of the ultrasonic motor 100 is small in consideration of the size.

In view of the above-described situation, it is an object of the present invention to provide an ultrasonic motor increasing an output per unit volume by driving the ultrasonic motor by using all of polarized portions provided to a piezoelectric element and enabling regular and reverse rotation thereof, and an electronic apparatus having an ultrasonic motor utilizing the ultrasonic motor.

SUMMARY OF THE INVENTION

In order to resolve the above-described problem, according to the invention, there is provided an ultrasonic motor characterized in that in an ultrasonic motor comprising a piezoelectric element for generating an oscillation wave and a moving member driven by the oscillation wave generated by the piezoelectric element, the ultrasonic motor including the piezoelectric element in a circular disk shape having polarized portions divided by a multiple of four in a circumferential direction, projections provided at upper portions of and spaced apart by odd numbers of the polarized portions of the piezoelectric element for taking out motor drive force from standing wave oscillation generated by the piezoelectric element, and a moving member driven by the projections brought into contact with upper ends of the projections, polarities of each two adjacent polarized portions are the same and polarities of adjacent pairs are reverse to each other, a first polarized portion group constituted by every other polarized portion and a second polarized portion group constituted by the polarized portions not belonging to the first polarized portion group, selecting whether phases of alternating voltage inputted to the first polarized portion group and the second polarized portion group are made to be the same phase or to constitute a phase difference of 180 degrees, a relative positional relationship between a standing wave oscillation generated in the piezoelectric element and the projections is changed to thereby switch a direction of driving the ultrasonic motor.

In this case, when positive voltage is applied to the polarized portion, the polarized portion subjected to the polarizing treatment in positive polarity is elongated and the polarized portion subjected to the polarizing treatment in negative polarity is contracted. Further, when negative voltage is applied, the elongation and contraction relationship is reversed. That is, according to the ultrasonic motor of the invention, motor drive is carried out by standing wave oscillation generated at the piezoelectric element by inputting alternating voltage to all of the polarized portions of the piezoelectric element and there is constructed a constitution in which the polarized portions are divided in a multiple of four over the circumferential direction, a wave of one wavelength is generated in the peripheral direction of continuous four polarized portions, the first and the second polarized groups are constituted by selecting every other polarized portions and accordingly, by making the phase of alternating voltage inputted to the first and the second polarized portion groups to be the same phase or inputting alternating voltage having a phase difference of 180°, the positional relationship between the projections for taking out output and the standing wave oscillation generated at the piezoelectric element is changed and the direction of rotating the moving member can be switched. That is, the driving direction can be switched regardless of applying the voltage to all of the polarized portions provided to the piezoelectric element.

Therefore, there can be provided an ultrasonic motor increasing an output per unit volume in comparison with a conventional motor and capable of switching the driving direction.

Further, according to the present invention, there is provided an ultrasonic motor characterized in that in the above-described ultrasonic motor, alternating voltage is inputted to both the first polarized portion group and the second polarized portion group, standing wave oscillation having a node at the center of the piezoelectric element and having one node (one node circle) over the diameter direction is generated, the projections for taking out output each is disposed at a position at an upper portion at every odd number of the polarized portion and at a position in the diameter direction which is the position maximizing the oscillation amplitude between the center of the piezoelectric element and the node circle of the standing wave oscillation and disposed at a position in the circumferential direction which is at a center in the peripheral direction of the upper portion at every odd number of the polarized portions.

According to the invention, strong oscillation is excited in the piezoelectric element since standing wave oscillation having one node, that is, one node circle in the diameter direction is generated. Further, the projection for taking out output is disposed at the position maximizing the oscillation amplitude between the center of the piezoelectric element and the node circle of the standing wave oscillation as the position in the diameter direction and arranged at the center in the peripheral direction of the upper portion of the every other polarized portion in the peripheral direction and accordingly, oscillation energy can most efficiently be converted into drive force of the moving member and accordingly, an effect by the above-described invention is achieved and the ultrasonic motor having higher output can be provided.

Further, the invention is characterized in an ultrasonic motor according to the above-described ultrasonic motor, in which there is provided at least one of auxiliary projections for maintaining balance of oscillation which is formed to be lower than the projection for taking out output such that the auxiliary projections are not brought into contact with the moving member between the respective projections for taking out output.

According to the invention, when the projections for taking out output are provided at only a portion of the polarized portions of the piezoelectric element, the balance of the total of the piezoelectric element is deteriorated, however, according to the invention, by providing the auxiliary projections, the balance of the flexing standing wave oscillation generated by the piezoelectric element can be regulated and further stabilized high output can be provided. In this case, the auxiliary projection is lower than the projection for taking out output and is not brought into contact with the moving member and therefore, the-driving thereof is not hampered.

Further, the invention is characterized in that in the above-described ultrasonic motor, an elastic member in a circular disk shape bonded to the piezoelectric element is provided and the projections for taking out output and the auxiliary projections are integrally formed at the surface of the elastic member in the circular disk shape.

According to the invention, by providing the projections directly on the upper face of the piezoelectric element, fabrication thereof is facilitated and the projections can be provided further inexpensively.

Further, the invention is characterized in that in the above-described ultrasonic motor, the invention is provided with a self-excited oscillation drive circuit for driving the ultrasonic motor by generating alternating voltage inputted to the first and the second polarized portion groups by self-excited oscillation of the piezoelectric element, the self-excited oscillation drive circuit is constituted by a first noninverted power amplifier and a first inverted power amplifier, output terminals of which are connected to the first polarized portion group of the piezoelectric element, a second power amplifier (noninverted or inverted) an output terminal of which is connected to the second polarized portion group of the piezoelectric element and a motor control circuit for starting and stopping the motor and switching the rotational direction by bringing the first noninverted power amplifier, the first inverted power amplifier and the second power amplifier respectively into an active state or a nonactive state.

In this case, the motor drive is carried out by bringing either the first noninverted power amplifier or the first inverted power amplifier and the second power amplifier (noninverted or inverted) simultaneously into the active state. In this case, the direction of driving the ultrasonic motor can be switched by selecting the first noninverted power amplifier or the first inverted power amplifier.

According to the invention, the ultrasonic motor can be driven very simply and an ultrasonic motor having excellent way of use, being inexpensive and having high power can be provided.

Further, the invention is characterized in an ultrasonic motor having polarized portions divided by a multiple of two in the circumferential direction and comprising an oscillator having a piezoelectric element in a circular disk shape for generating standing wave by inputting same voltage to all of the polarized portions, projections provided to the oscillator and provided onto faces of the polarized portions of the piezoelectric element, a moving member brought into contact with the projections and driven by the projections and a self-excited drive circuit constituted by a power amplifier an output terminal of which is connected to the plurality of polarized portions and a motor control circuit for starting or stopping the motor by bringing the power amplifier into an active state or a nonactive state.

According to the invention, for use of one direction rotation, high output can be realized very inexpensively.

Further, the invention is characterized in that in the above-described ultrasonic motor, the self-excited oscillation drive circuit is provided with a condenser connected in series with the polarized portions provided to the piezoelectric element and an LC resonating circuit is constituted by induction performance provided when the piezoelectric element is brought into mechanical resonating state and the condenser to thereby drive the motor by bringing the piezoelectric element into self-excited oscillation.

According to the invention, there is constructed the constitution in which frequency selecting performance in the self-excited oscillation drive circuit is provided by the LC resonating circuit comprising the induction performance provided when the piezoelectric element is brought into the mechanical resonating state and the condenser and accordingly, the stable self-excited oscillation can be realized, as a result, there is provided the ultrasonic motor excellent in stability in addition to high output.

Further, the invention is characterized in that there is provided an electronic apparatus having the above-described ultrasonic motor as a drive force source (for example, analog time piece having the ultrasonic motor).

According to the invention, in comparison with the conventional ultrasonic motor, the ultrasonic motor having large output is used and accordingly, by further downsizing the ultrasonic motor, or by downsizing power transmission mechanism, electronic apparatus having the ultrasonic motor such as electronic time piece, measuring instrument, camera, printer, printing machine, machine tool, robot, moving apparatus, storing apparatus or the like can be downsized.

BRIEF DESCRIPTION OF THE DRAWINGS

FIG. 3 is an outline developed side view for explaining a wiring structure of lead wires of the piezoelectric element;

FIGS. 5A and 5B are outline views for explaining operation of the ultrasonic motor;

DETAILED DESCRIPTION OF THE PREFERRED EMBODIMENTS (Embodiment 1)

A detailed explanation will be given of an ultrasonic motor 1 according to an embodiment of the invention in reference to FIG. 1 through FIG. 6B as follows.

Figure 1:
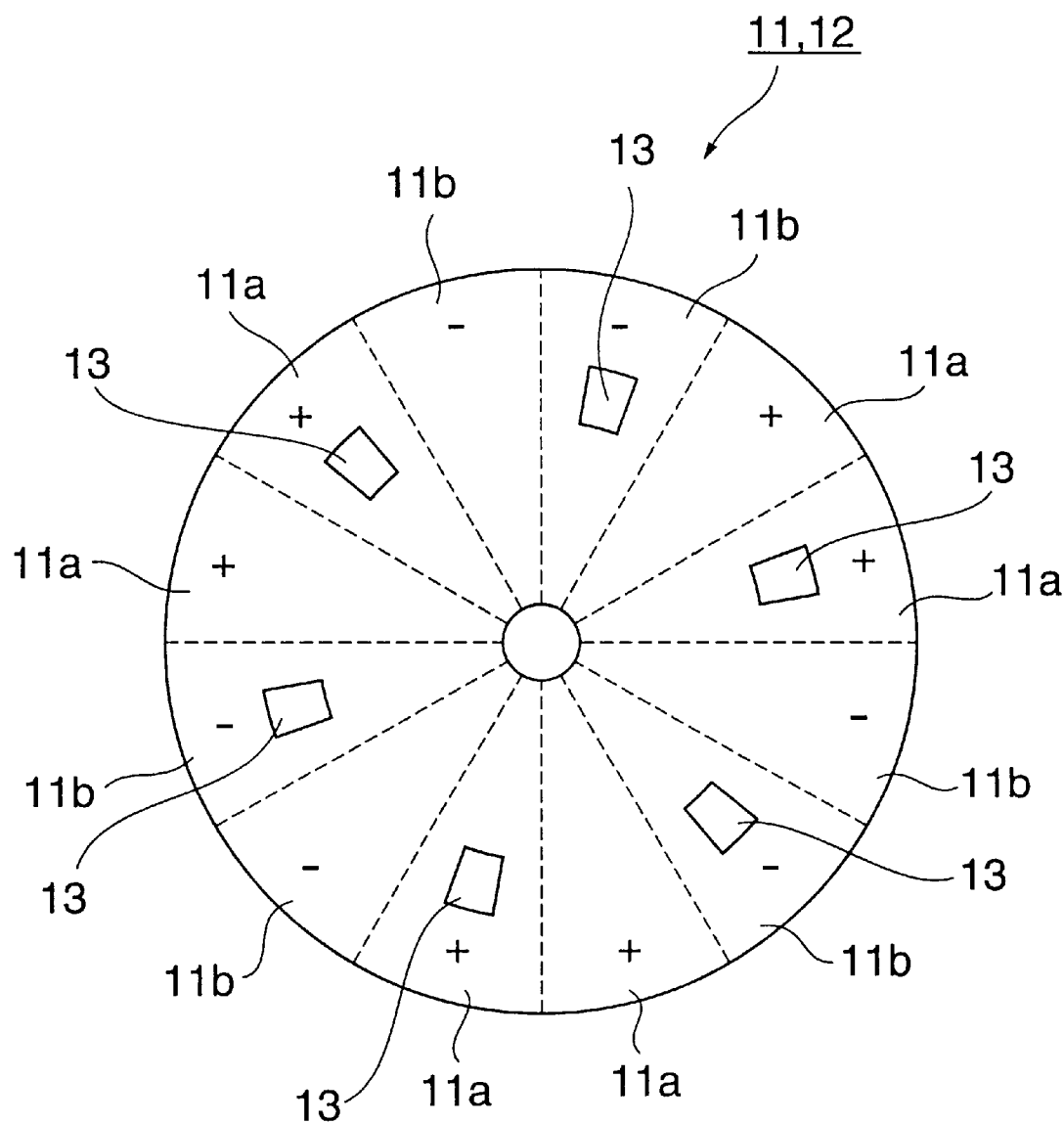
FIG. 1 is an outline top view for explaining a structure and positions of projections of a piezoelectric element used in an ultrasonic motor according to Embodiment 1 of the present invention.
Figure 2A:
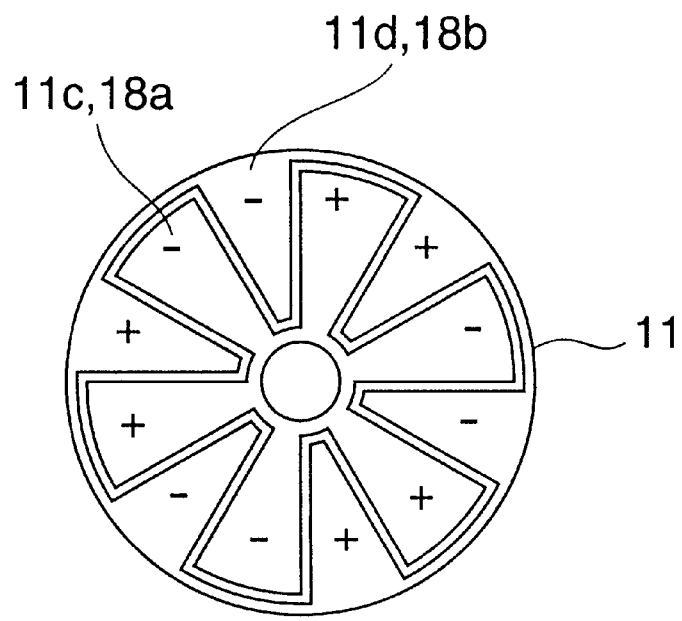
FIGS. 2A and 2B are outline views for explaining a structure of an electrode of a piezoelectric element of the ultrasonic motor.
Figure 2B:
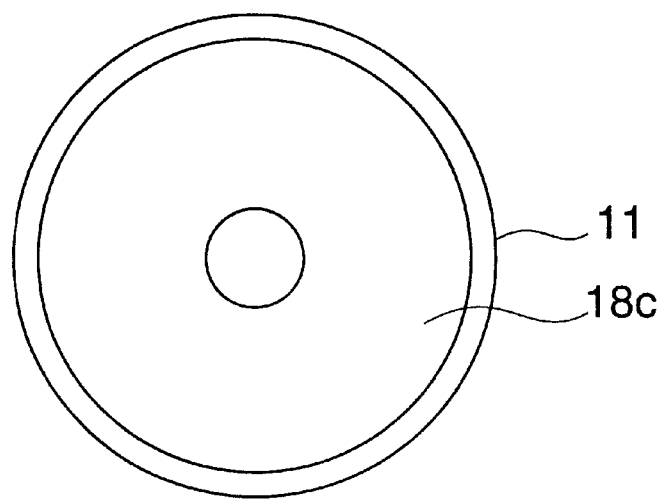

FIG. 1 is an outline top view for explaining a structure of a piezoelectric-element 11 used in the ultrasonic motor 1 and positions of projections 13 and FIGS. 2A and 2B are outline views for explaining an electrode structure of the piezoelectric element 11.

Figure 4:
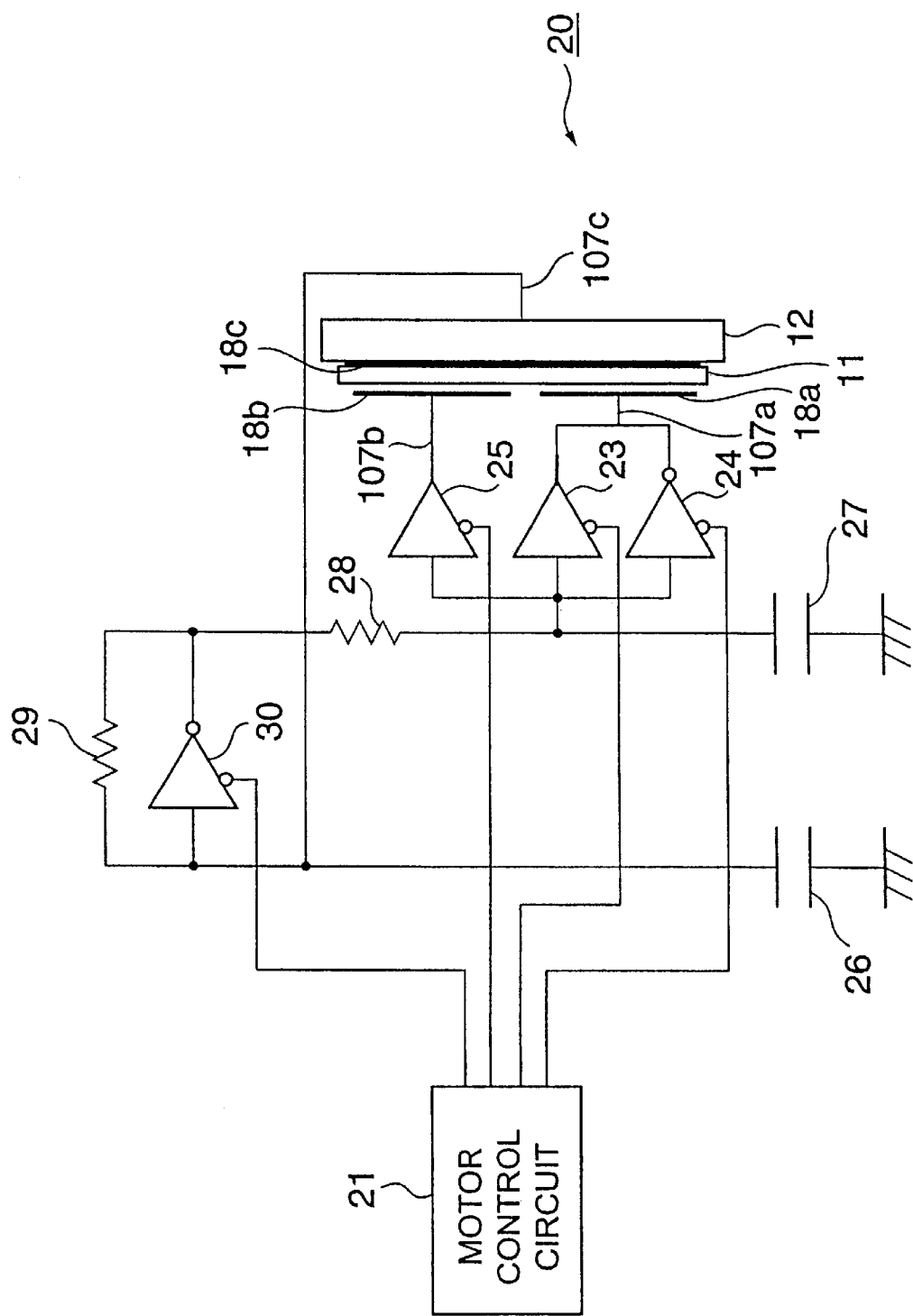
FIG. 4 is a constitution diagram of a self-excited oscillation drive circuit of the ultrasonic motor.
Figure 6A:
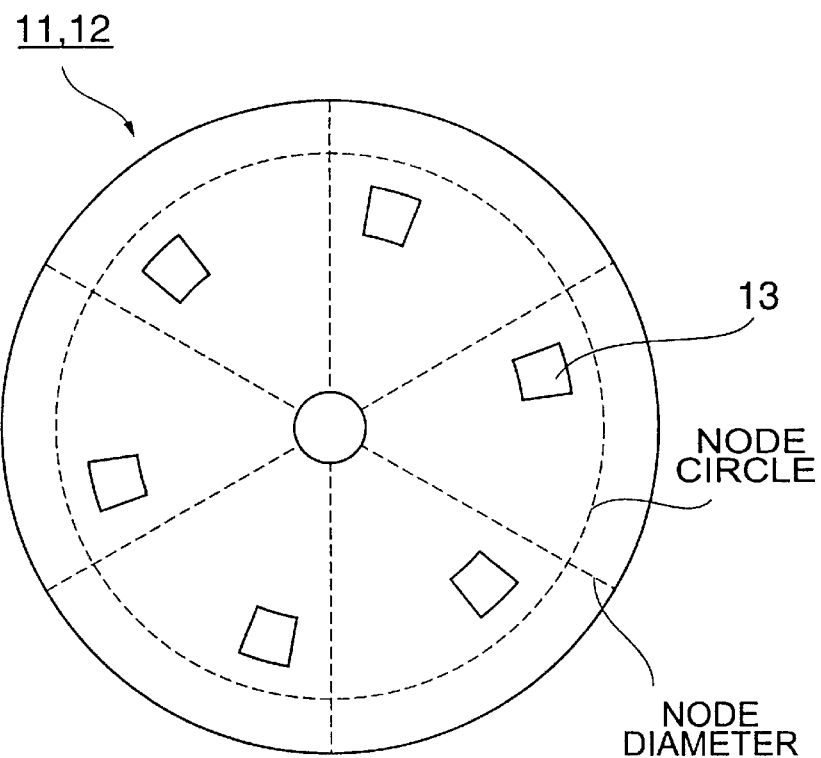
FIGS. 6A and 6B are views for explaining a positional relationship between an oscillation mode and projections 13 of the ultrasonic motor.
Figure 6B:
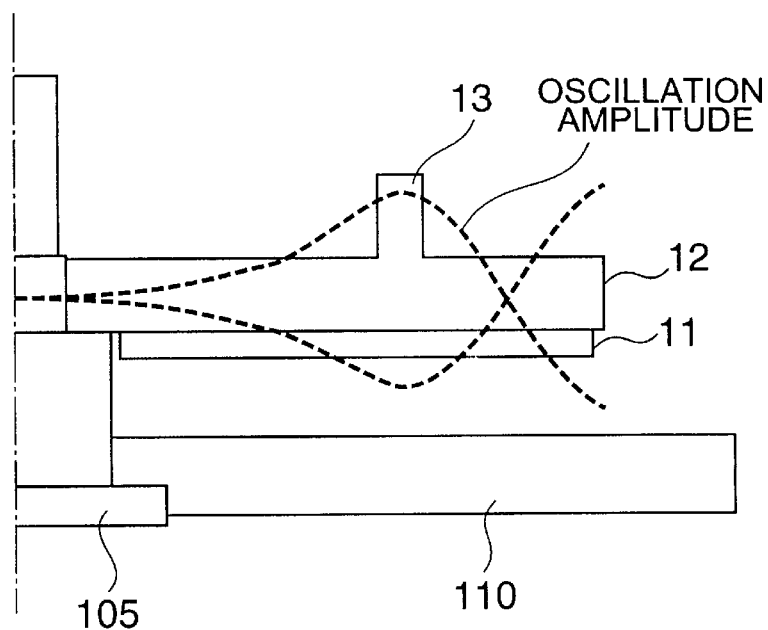

Further, FIG. 3 is an outline developed side view for explaining wirings of lead wires 107a, 107b and 107c and FIG. 4 is a diagram for explaining a constitution of a self-excited oscillation drive circuit 20. FIGS. 5A and 5B are outline views for explaining operation of the ultrasonic motor 1. Further, FIGS. 6A and 6B are views for explaining a positional relationship between an oscillation mode and the projections 13.

First, an explanation will be given of a constitution of the ultrasonic motor 1.

The ultrasonic motor 1 is substantially constituted by the piezoelectric element 11 in a circular plate shape, an oscillator 12 as an elastic member adhered onto the piezoelectric element 11, a plurality of the projections 13 (projections for taking out output) erected integrally at an upper face of the oscillator 12 as the elastic member for amplifying oscillation of the oscillator 12 generated by the piezoelectric element 11, the rotor 104 (moving member) which is brought into contact with the projections 13 from above and rotated in accordance with drive force transmitted from the projections 13 via friction, the support shaft 105 penetrating centers of the piezoelectric element 11 and the oscillator 12, holding the piezoelectric element 11 and the oscillator 12 above the base plate 110 and playing a role of guiding rotation of the rotor 104, and the spring 106 for depressing a rotational center at an upper portion of the rotor 104 downwardly and ensuring predetermined contact pressure between the rotor 104 and the projections 13.

Further, as shown by FIG. 1, a polarization structure of the piezoelectric element 11 is the same as that of the piezoelectric element 101, further, structures of the oscillator 12 and the projections 13 are also the same as structures of the oscillator 102 and the projections 103.

That is, the ultrasonic motor 1 is provided with a structure substantially the same as that of the ultrasonic motor 100, however, a positional relationship between the piezoelectric element 11 and the projections 13 differs, further, the ultrasonic motor 1 is constituted to be driven by the self-excited oscillation drive circuit 20.

Therefore, illustration of the total constitution of the ultrasonic motor 1 will be omitted and in the following, a detailed explanation will be given of an electrode structure of the piezoelectric element 11, a positional relationship between respective polarized portions and the projections 13 of the piezoelectric element 11 and drive principle.

As shown by FIG. 1, the projections 13 are arranged at every other one of the upper faces of polarized portions 11a and 11b of the piezoelectric element 11 and are dispose substantially at centers of the polarized portions.

Further, according to the piezoelectric element 11, as shown by FIG. 2A and FIG. 3, a lower face thereof is provided with an electrode 18a connected to the lead wire 107a and an electrode 18b connected to the lead wire 107b as electrodes for inputting drive voltage, further, as shown by FIG. 2B and FIG. 3, an upper face thereof is provided with an electrode 18c to cover substantially a total of the upper face. The oscillator 12 adhered to the piezoelectric element 11 is made of an aluminum alloy and the electrode 18c of the piezoelectric element 11 is brought into a state of being electrically conducted to the oscillator 12. Here, the electrode 18c is connected to the lead wire 107c via the oscillator 12.

Further, signs of plus (+) and minus (−) in the drawing represent polarities of polarization, in this case, a polarizing treatment is carried out in the thickness direction of the piezoelectric element 101, plus (+) indicates that the polarizing treatment is carried out in a direction from the piezoelectric element 101 toward the oscillator 102 and minus (−) indicates that the polarizing treatment is carried out conversely in a direction from the oscillator 102 toward the piezoelectric element 101.

In this case, the electrode 18a covers a polarized portion group 11c (first polarized portion group) constituted by selecting every other one of the polarized portions 11a and 11b, further, the electrode 18b covers a polarized portion group 11d (second polarized portion group) constituted by the remaining polarized portions and accordingly, the electrode 18b covers every other one of the polarized portions reversely to the electrode 18a.

Further, the electrode 18a forms one electrode by connecting electrode portions on the respective polarized portions by providing portions thereof at an inner edge portion of the piezoelectric element 11 over a total periphery thereof, further, the electrode 18b forms one electrode by connecting electrode portions on the respective polarized portions by providing portions thereof at an outer edge portion of the piezoelectric element 11 over the total periphery.

Further, according to the embodiment, as shown by FIG. 3, all of the respective polarized portions provided with the projections 13 on upper faces thereof belong to the polarized portion group 11c.

FIG. 4 shows the constitution of the self-excited oscillation drive circuit 20 of the ultrasonic motor 1. The self-excited oscillation drive circuit 20 is generally constituted by a motor control circuit 21 comprising CPU (Central Processing Unit), RAM (Random Access Memory), ROM (Read Only Memory) and the like for controlling a drive state of the ultrasonic motor 1, a tri-state buffer 23 as a first noninverted power amplifier and a tri-state inverter 24 as a first inverted power amplifier, output terminals of which are connected to the electrode 18a of the piezoelectric element 11, a tri-state buffer 25 as a second noninverted power amplifier, an output of which is connected to the electrode 18b of the piezoelectric element 11, a condenser 26 which is for constituting an LC resonating circuit along with an induction performance indicating that the piezoelectric element 11 adhered with the oscillator 12 is brought into a mechanical resonating state, one end of which is connected to the electrode 18c of the piezoelectric element 11 via the oscillator 12 made of an aluminum alloy and other end which is grounded, a try-state inverter 30 as a preamplifier (inverted power preamplifier), an input terminal of which is connected to the condenser 26 and the electrode 18c (oscillator 12) of the piezoelectric element 11, an output terminal of which is connected to input terminals of the tri-state buffer 23, the tri-state inverter 24 and the tri-state buffer 25 via a limiting resistor 28, a feedback resistor 29 connected in parallel with the input and the output terminal of the tri-state inverter 30 for stabilizing an operating point of the tri-state inverter 30, and a condenser 27 one end of which is connected to the tri-state buffer 23, the tri-state inverter 24, the tri-state buffer 25 and the limiting resistor 28 and other end of which is grounded. In this case, an integrating circuit is constituted by the limiting resistor 28 and the condenser 27 for setting an oscillation frequency in subjecting the piezoelectric element 11 adhered with the oscillator 12 to self-excited oscillation by the self-excited oscillation drive circuit 20 to a value optimum for driving thereof and restraining abnormal oscillation (sprious oscillation).

That is, the self-excited oscillation drive circuit 20 constitutes a self-excited oscillation circuit for driving the motor by subjecting the piezoelectric element 11 adhered with the oscillator 12 to self-excited oscillation. Further, each of the tri-state buffer 23, the tri-state inverter 24 and the tri-state buffer 25 connected to the electrodes 18a and 18b of the piezoelectric element 11 for applying a drive signal to the piezoelectric element 11 and the tri-state inverter 30 for playing a role as the preamplifier, is provided with a control terminal other than the input and the output terminals as is well known, thereby whether the amplifiers function as power amplifiers, (whether active state or inactive state) can be controlled by control signals to the control terminals. Specifically, whether the output terminal is brought into a high impedance state can be controlled by the control signal.

That is, as will be described later in details, the self-excited oscillation drive circuit 20 carried out motor drive by bringing the tri-state inverter 30 as the preamplifier, the tri-state buffer 23 for supplying drive power to the piezoelectric element 11 and either the tri-state buffer 23 or the tri-state inverter 24 into an active state by an output signal from the motor control circuit 21. In this case, the rotational direction of the ultrasonic motor 1 can be switched by which of the tri-state buffer 23 and the tri-state inverter 24 is brought into the active state. Naturally, when the ultrasonic motor is stopped, all of the power amplifiers 23, 24, 25 and 30 are brought into the nonactive state by the output signal of the motor control circuit 21.

Next, an explanation will be given of the principle of operating the ultrasonic motor 1 in reference to FIG. 5.

First, as illustrated in FIG. 5A, when alternating voltage having the same phase is inputted to both the electrode 18a and the electrode 18b, the piezoelectric element 11 adhered with the oscillator 12, is generated with flexing standing wave oscillation in which nodes of oscillation are disposed at boundaries between the polarized portions 11a and 11b. In this case, the projection 13 is disposed substantially at an intermediary between an antinode and a node on the left side of the oscillation, the projection 13 draws a locus in an arch-like shape along with oscillation and is provided with a displacement component in the left direction when the projection 13 rises and accordingly, the moving member which is brought into press contact with the projection 13 from above is moved on the left side.

Next, as illustrated in FIG. 5B, when the electrode 18a and 18b are inputted with drive voltages having inverse phases, the position of the flexing standing wave oscillation generated in the piezoelectric element 11 is shifted by an amount of a single of the polarized portion. Therefore, the projection 13 is disposed substantially at an intermediary of an antinode and a node on the right side of oscillation, the projection 13 draws a locus in an arch-like shape along with the oscillation and is provided with a displacement component in the right direction reverse to that when the projection 13 rises and therefore, the moving member is moved on the right side.

Further, a detailed explanation will be given of a positional relationship between a mode of the standing wave oscillation generated at the piezoelectric element 11 and the projection 13 integrally provided to the surface of the oscillator 12 in reference to FIGS. 6A and 6B.

In the piezoelectric element 11, there is oscillated an oscillation mode shown by FIG. 6A by the self-excited oscillation drive circuit 20. That is, there is self-excitedly resonated standing wave oscillation of three waves (three node diameters) in the peripheral direction and having one node circle in the diameter direction. That is, four of the polarized portions equally divided in the peripheral direction correspond to one wavelength. According to the embodiment, a number of the polarized portions is 12 and accordingly, a mode of three waves can be excited in the peripheral direction. In this case, the projections 13 provided in the oscillator 12 are arranged to dispose at intermediaries between antinodes and nodes of the standing wave in the peripheral direction according to a positional relationship of the polarized portion 11a and 11b of the piezoelectric element 11.

Further, in this case, the mode having the single node circle is utilized in motor drive, thereby, there is provided oscillation stronger than that of a mode which is not provided with the node circle, as a result, there is provided a higher output as the ultrasonic motor. Further, with regard to the position of the projection in the diameter direction, as shown by FIG. 6B, the projection is arranged at a position between the center of the oscillator 12 adhered with the piezoelectric element 11 and the node circle where displacement of the oscillation is maximized to thereby realize the ultrasonic motor having high efficiency.

As described above, according to the ultrasonic motor 1 constituting an embodiment of the invention, the piezoelectric, element 11 is constructed by a structure in which every other two of the polarized portions 11a polarized in the positive polarity and the polarized portions 11b polarized in the inverse polarity, are alternately arranged and is constructed by a constitution in which drive voltage is applied to the polarized portion group 11c constituted by selecting every other polarized portions and the polarized portion group 11d constituted by the remaining polarized portions, independently from each other and accordingly, the direction of driving the ultrasonic motor 1 can be selected by selecting whether the phase of the drive voltage applied to the polarized portion group 11d is made to coincide with the phase of the drive voltage applied to the polarized portion group 11c or the phase difference is made to be 180°.

That is, according to the ultrasonic motor 1, the ultrasonic motor 1 is driven by utilizing the total face of the piezoelectric element 11 in the circular shape and the rotational direction can be switched and therefore, there can be realized the ultrasonic motor capable of rotating in regular and reverse directions having a large output per unit volume.

Figure 7A:
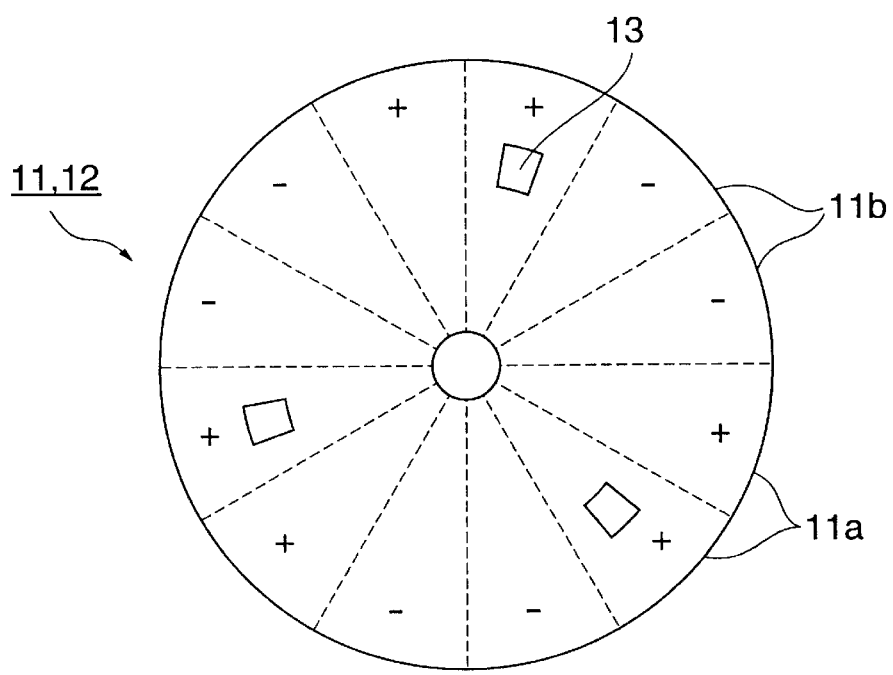
FIGS. 7A and 7B are an outline top view and an outline developed side view for explaining a constitution of a piezoelectric element used in a modified example of the ultrasonic motor.
Figure 7B:
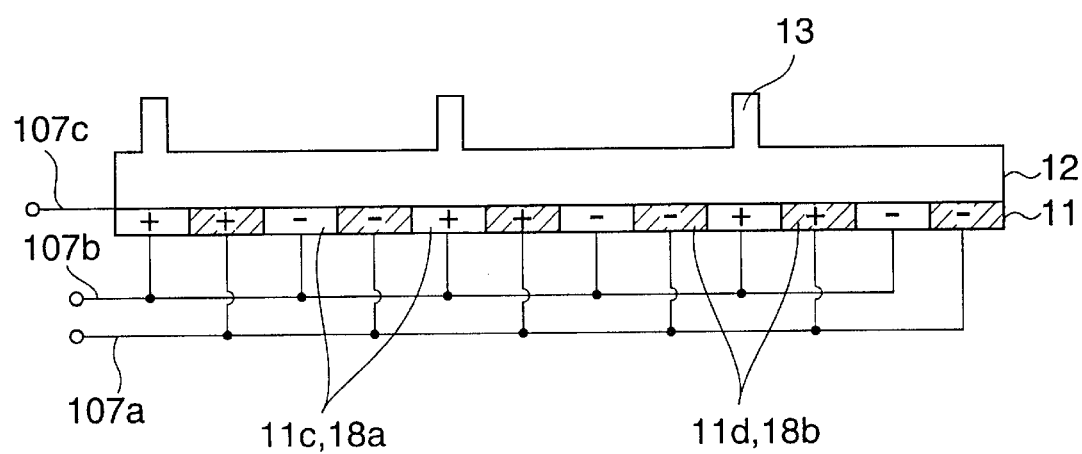

Further, according to the ultrasonic motor 1, as shown by a modified example shown in an outline top view of FIG. 7A and an outline developed side view of FIG. 7B, every other projections 13 may be thinned and the number may be a total of three.

As is well known, a plane is determined by three points and accordingly, according to the structure of the modified example, a rotor 104 is stably supported without being swung above the projections 13 and accordingly, driving of the ultrasonic motor 1 is further stabilized.

Further, although according to the embodiment, the oscillator of an aluminum alloy integrally formed with the projections 13 is adhered to the piezoelectric element 11, the projections may be formed integrally on the surface of the piezoelectric element 11 without using the oscillator 12, or projections of ceramics, metal or plastic may be fabricated and bonded onto the surface of the piezoelectric element 11 by adhering or the like. That is, even when the oscillator 12 is not used, in the case in which there are projections for taking out the output at upper portions of every other odd number of the electrode portions of the piezoelectric element 11, a similar ultrasonic motor is provided.

(Embodiment 2 )

Figure 8A:
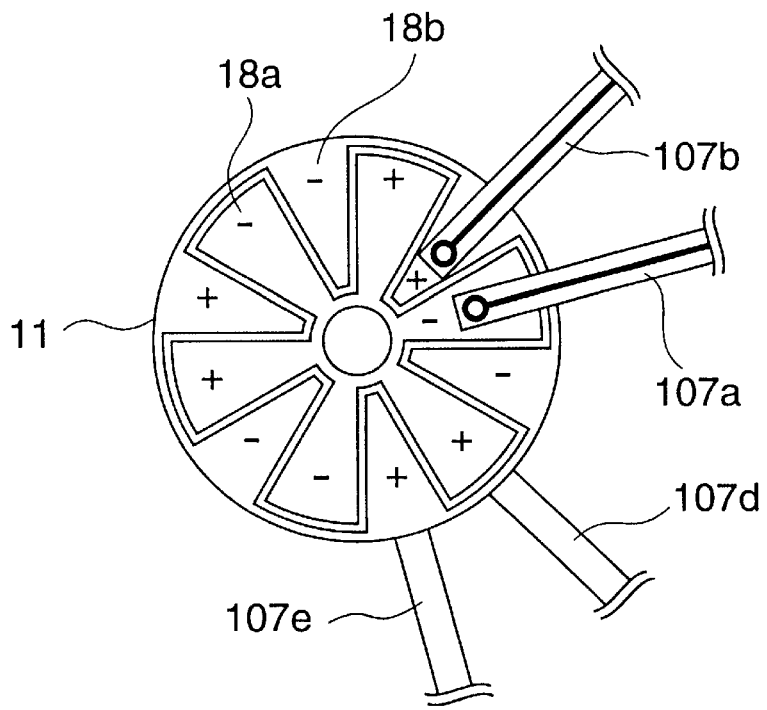
FIGS. 8A and 8B are a bottom view and a top view for explaining a structure of an electrode of a piezoelectric element and lead wires used in an ultrasonic motor 2 according to Embodiment 2 of the invention.
Figure 8B:
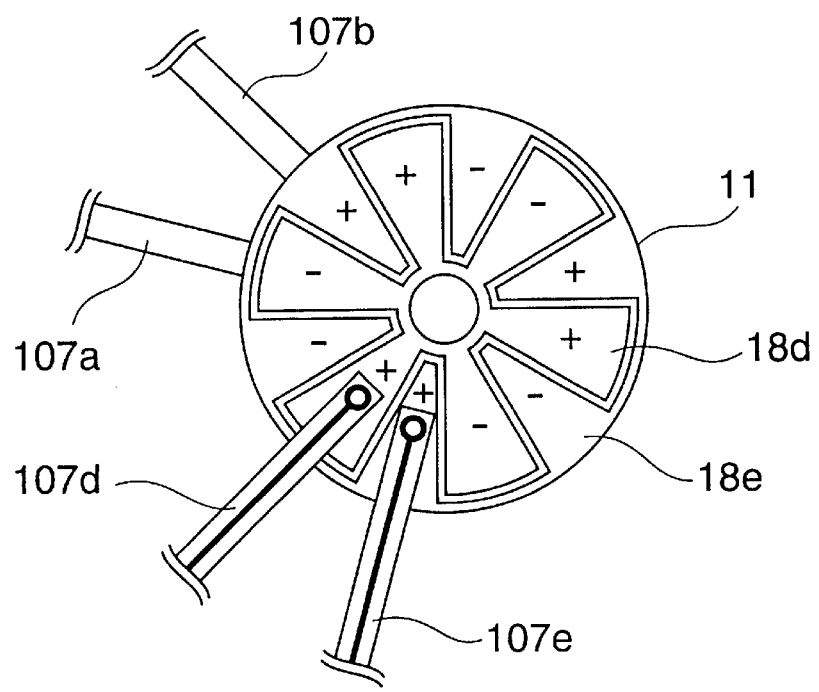
Figure 9:
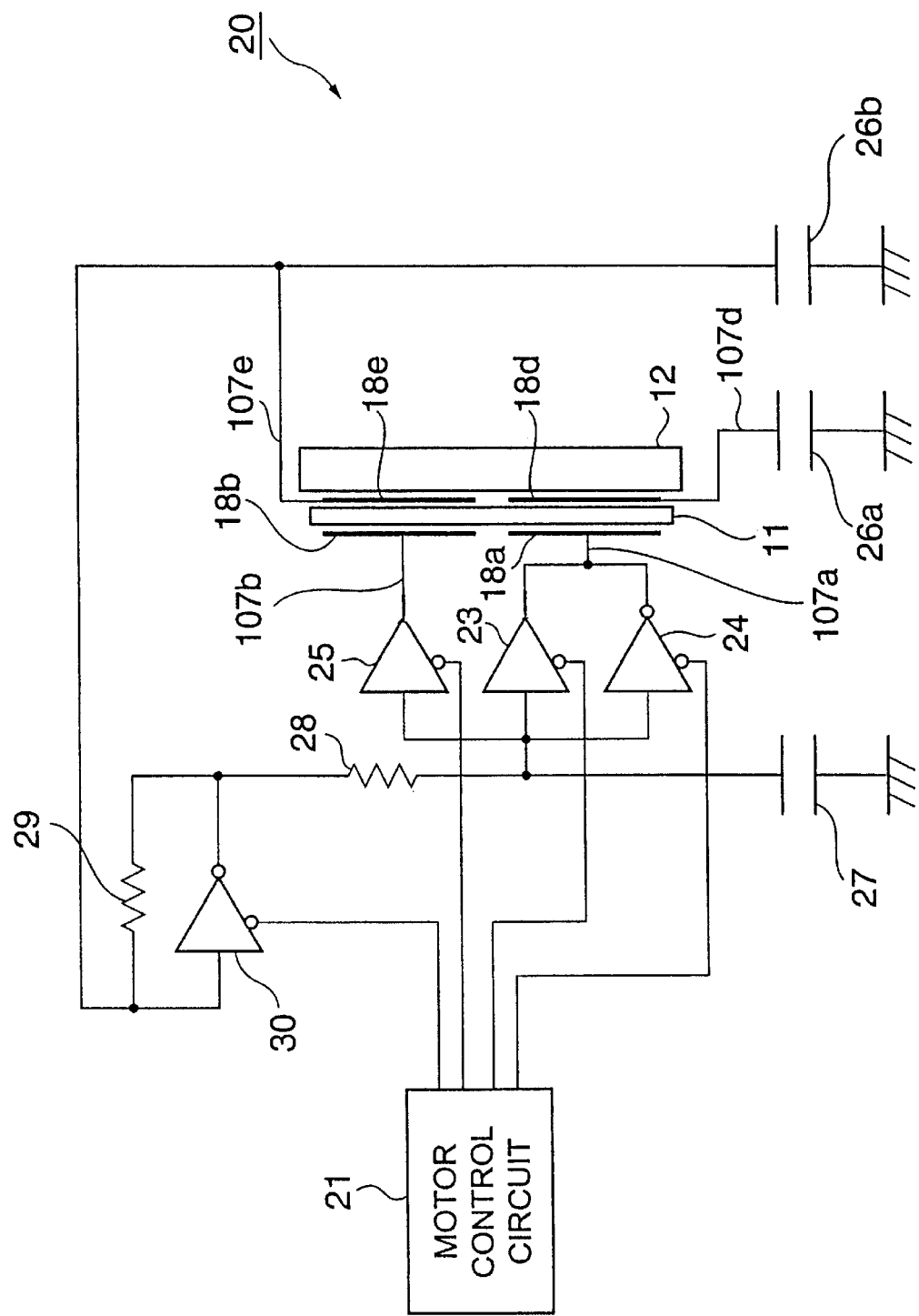
FIG. 9 is a diagram for explaining a constitution of a self-excited oscillation drive circuit of the ultrasonic motor.

FIGS. 8A and 8B are outline views for explaining an electrode structure of the piezoelectric element 11 of an ultrasonic motor 2 according to Embodiment 2 of the invention and lead wires 107a, 107b, 107d and 107e. Further, FIG. 8A is a view of a lower face and FIG. 8B is a view of an upper face which is on a side adhered to the oscillator 12. Further, FIG. 9 is a view for explaining a constitution of the self-excited drive circuit 20.

Although the constitution of the ultrasonic motor 2 is basically the same as that of the ultrasonic motor 1, described above, the constitution is featured in the electrode structure of the piezoelectric element 11, the lead wires 107a, 107b, 107d and 107e and the self-excited oscillation drive circuit 20. According to the piezoelectric element 11, as shown by FIG. 8A, a face thereof opposed to a face thereof adhered to the oscillator 12, that is, a lower face thereof is provided with the electrode 18a connected to the lead wire 107a and the electrode 18b connected to the lead wire 107b as electrodes for inputting drive voltage, further, as shown by FIG. 8B, the face adhered to the oscillator 12, that is, an upper face thereof is provided with electrodes 18d and 18e having shapes the same as those of the electrodes 18a and 18b provided to the lower face and at positions the same as those thereof and the electrodes 18d and 18e are respectively connected to the lead wires 107d and 107e. In this case, a detailed method of constituting the electrodes 18a, 18b, 18d and 18e and directions of polarization thereof are the same as those in the electrodes 18a and 18b according to Embodiment 1 and an explanation thereof will be omitted.

Although there is used the oscillator 12 having a shape the same as that of the ultrasonic motor 1 according to Embodiment 1, described above, the oscillator 12 is subjected to alumite treatment. According to the ultrasonic motor 2 constituting Embodiment 2, the piezoelectric element 11 is provided with two sets of the electrodes 18d and 18e also on the side of the face adhered to the oscillator 12 and accordingly, in the case of the oscillator made of an aluminum alloy, the electrode 18d and the electrode 18e are brought into a shortcircuited state by adhering and accordingly, the oscillator 12 is constituted by insulated formation by the alumite treatment. Further, by carrying out the alumite treatment, there is simultaneously achieved an effect of restraining wear of the projections 13 by friction with the rotor 104 by hardening the surface of the oscillator 12.

In this case, the lead wires 107a, 107b, 107d and 107e are constituted by flexible printedboards in a strip-like shape. According to the flexible printed boards, faces thereof opposed to faces thereof achieving connection with the electrodes 18a, 18b, 18d and 18e of the piezoelectric element 11, are formed with copper wiring patterns subjected to solder plating and bonded to the electrodes by soldering by providing through holes at portions thereof connected to the electrodes 18a, 18b, 18c and 18d.

Further, the flexible printed boards of the lead wires 107d and 107e connected to the electrodes 18d and 18e at the face adhered to the oscillator 12, are connected to the piezoelectric element 11 and the oscillator 12 in the form in which front end portion thereof are sandwiched between the piezoelectric element 11 and the oscillator 12 after having been connected to the electrodes 18d and 18e by soldering.

Next, an explanation will be given of the constitution of the self-excited oscillation drive circuit 20 in reference to FIG. 9. The self-excited oscillation drive circuit 20 is generally constituted by the motor control circuit 21 comprising CPU (Central Processing Unit), RAM (Random Access Memory), ROM (Read Only Memory) and the like for controlling the drive state of the ultrasonic motor 2, the tri-state buffer 23 as the first noninverted power amplifier and the tri-state inverter 24 as the first noninverted power amplifier, the output terminals of which are connected to the electrode 18a of the piezoelectric element 11, the tri-state buffer 25 as the second noninverted power amplifier, the output of which is connected to the electrode 18b of the piezoelectric element 11, a condenser 26a which is for constituting the LC resonating circuit along with induction performance which the piezoelectric element 11 adhered with the oscillator 12 displays by a mechanical resonance state, one end of which is connected to the electrode 18d of the piezoelectric element 11 and other end of which is grounded and a condenser 26b one end of which is similarly connected to the electrode 18e of the piezoelectric element 11 and other end of which is grounded, the tri-state inverter 30 as the preamplifier (inverted power preamplifier), the input terminal of which is connected to the condenser 26b and the electrode 18e of the piezoelectric element 11 and the output terminal of which is connected to the input terminals of the tri-state buffer 23, the tri-state inverter 24 and the tri-state buffer 25 via the limiting resistor 28, the feedback resistor 29 connected in parallel with the input and the output terminals of the tri-state inverter 30 for stabilizing the operating point of the tri-state inverter 30, and the condenser 27 one end of which is connected to the tri-state buffer 23, the tri-state inverter 24, the tri-state buffer 25 and the limiting resistor 28 and the other end of which is grounded. In this case, the integrating circuit is constituted by the limiting resistor 28 and the condenser 27, the oscillation frequency in subjecting the piezoelectric element 11 adhered with the oscillator 12 to self-excited oscillation by the self-excited oscillation drive circuit 20 is set to the value optimum for driving the piezoelectric element 11 and abnormal oscillation (sprious oscillation) is restrained.

That is, the self-excited oscillation drive circuit 20 constitutes the self-excited oscillation circuit for driving the motor by subjecting the piezoelectric element 11 adhered with the oscillator 12 to self-excited oscillation. Further, the tri-state buffer 23, the tri-state inverter 24 and the tri-state buffer 25 which are connected to the electrodes 18a and 18b of the piezoelectric element 11 for applying the drive signal to the piezoelectric element 11 and the tri-state inverter 30 playing the role of the preamplifier, are respectively provided with the control terminals other than the input and the output terminals as is well known and can control whether these are functioned as power amplifiers or not (active state or nonactive state) by the control signals to the control terminals. Specifically, whether the output terminal is brought into a high impedance state can be controlled by the control signal.

That is, the self-excited oscillation drive circuit 20 carries out motor drive by bringing the tri-state inverter 30 as the preamplifier, the tri-state buffer 23 for supplying the drive power to the piezoelectric element 11, and either the tri-state buffer 23 or the tri-state inverter 24 into the active state by the output signal of the motor control circuit 21. In this case, the rotational direction of the ultrasonic motor 2 can be switched by which of the tri-state buffer 23 and the tri-state inverter 24 is brought into the active state. Naturally, when the ultrasonic motor is stopped, all of the power amplifiers 23, 24, 25 and 30 are brought into the inactive state by the output signal of the motor control circuit 21.

The ultrasonic motor according to Embodiment 2 of the invention is featured in that divided electrodes are used also on the side of the face of the piezoelectric element 11 adhered to the oscillator 12. According to the ultrasonic motor 1, mentioned above, in the self-excited oscillation drive circuit 20, there is constituted the electrode 18c for taking out the feedback signal to the tri-state inverter 30 as the preamplifier, the common electrode is constituted for the two polarized portions and in the case of applying signals having inverse phases to the electrode 18a and the electrode 18b, in comparison with the case of applying signals having the same phase, the level of the feedback signal is reduced and the adjustment range of the oscillation drive frequency in carrying out self-excited oscillation drive is slightly narrowed. Hence, according to the ultrasonic motor 2, the electrode for taking out the feedback signal is not constituted by the common electrode 18c for the electrodes 18a and 18b but is divided into the electrodes 18d and 18e to thereby facilitate to provide the feedback signal in the case of inverse phase drive. Thereby, although the cost is more or less increased, the ultrasonic motor 2 is provided with a function further higher than that of the ultrasonic motor 1.
(Embodiment 3)

Figure 10A:
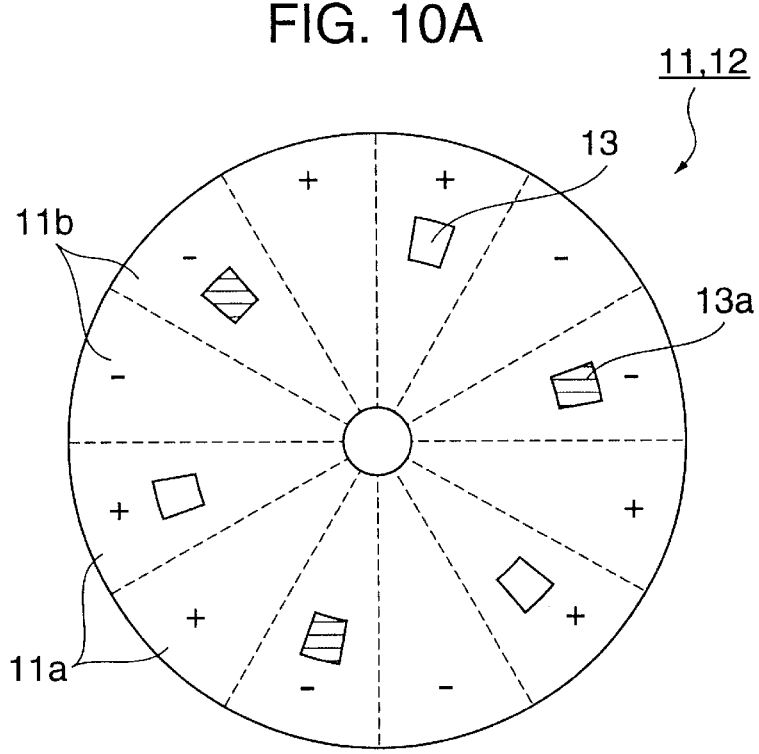
FIGS. 10A and 10B are an outline top view and an outline developed side view for explaining a constitution of a piezoelectric element used in Embodiment 3 of the invention.
Figure 10B:
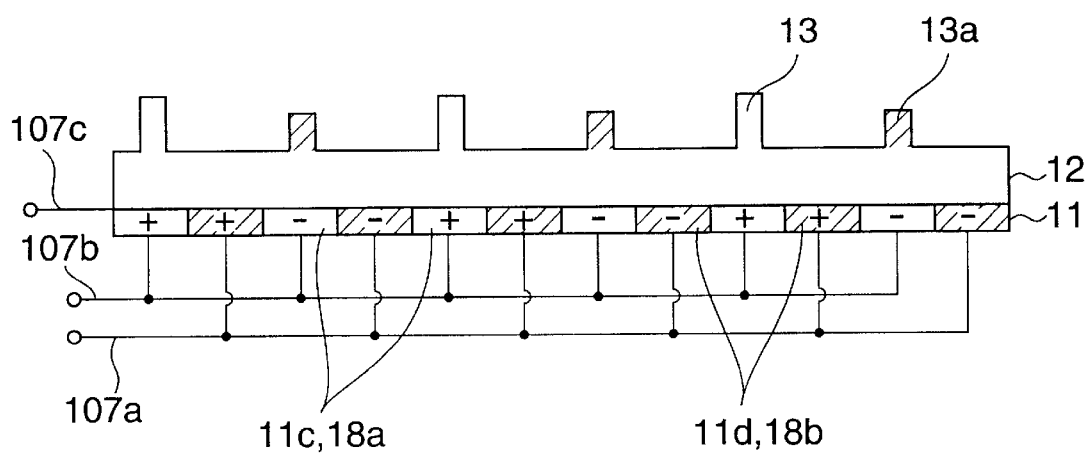

FIG. 10A is an outline top view for explaining arrangement of the projections 13 and auxiliary projections 13a of an ultrasonic motor 3 according to Embodiment 3 of the invention and FIG. 10B is an outline developed side view for explaining arrangement and constitution of the auxiliary projections 13a.

The ultrasonic motor 3 is provided with a constitution substantially the same as that of the ultrasonic motor 1 although a total structure thereof is not illustrated and constitution and arrangement of the projections provided to the oscillator 12 are changed.

That is, according to a modified example of the ultrasonic motor 1, mentioned above, the ultrasonic motor 3 is constructed by a constitution provided with the auxiliary projections 13a at portions of the ultrasonic motor 1 where the projections 13 are thinned.

The sectional shape of the auxiliary projection 13a is the same as that of the projection 13, a height of which is made lower than that of the projection 13 to thereby prevent from being brought into contact with the rotor 104 and the function resides in correcting a balance in the circumferential direction of the piezoelectric element 11 and the oscillator 12 deteriorated by providing the projections 13.

As a result, the ultrasonic motor 2 is provided with a high function having both of an oscillation characteristic substantially equivalent to that of the ultrasonic motor 1 and rotor setting stability of the modified example of the ultrasonic motor 1.

Figure 11A:
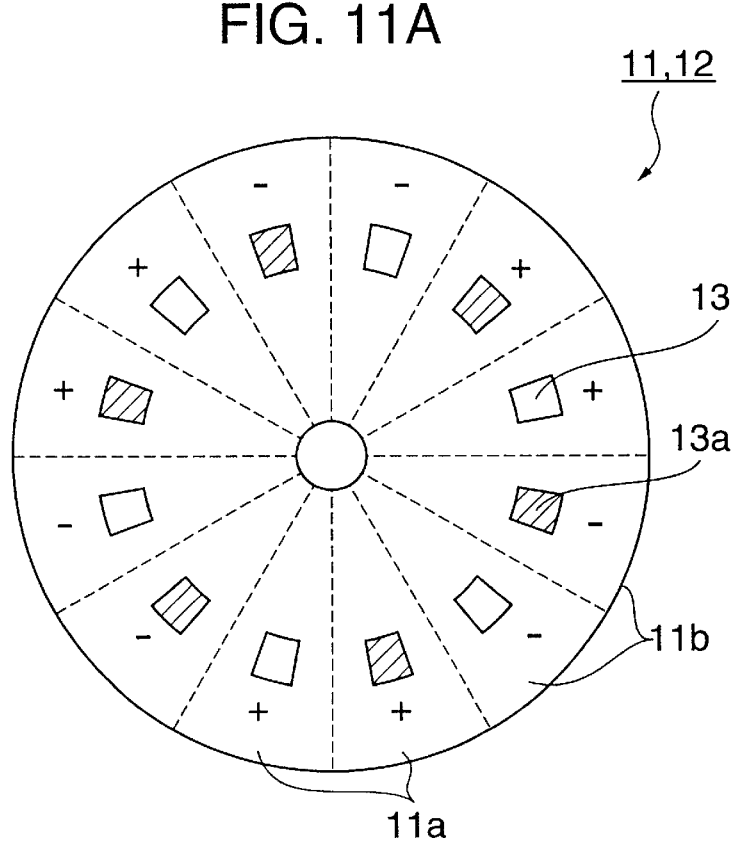
FIGS. 11A and 11B are an outline top view and an outline developed side view for explaining a constitution of a piezoelectric element used in a modified example of the ultrasonic motor.
Figure 11B:
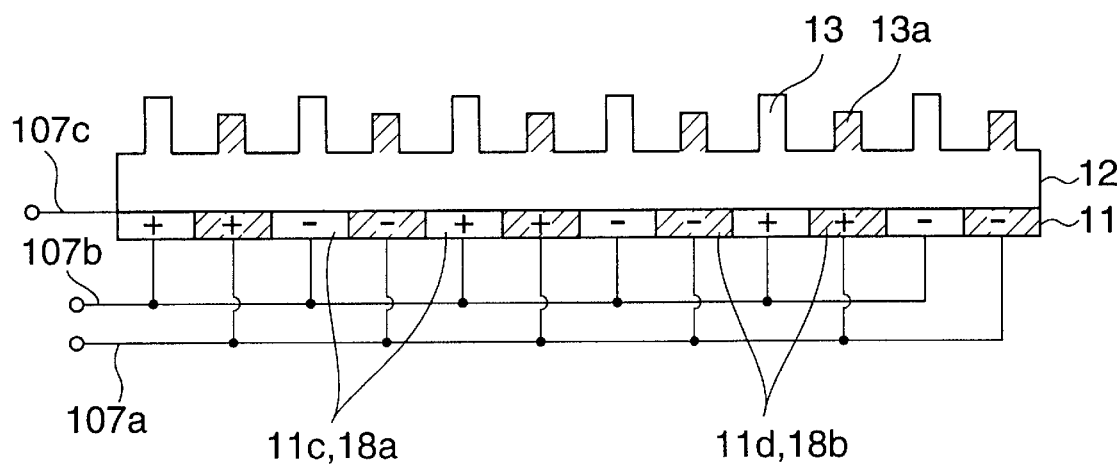

Further, according to the ultrasonic motor 3, as shown by FIGS. 11A and 11B, there may be constructed a constitution in which the projections 13 are provided to all of upper faces of the polarized portions belonging to the polarized portion group 11d and the auxiliary projections 13a are provided to all of upper portions of the polarized portions belonging to the polarized portion group 11c.

Figure 12A:
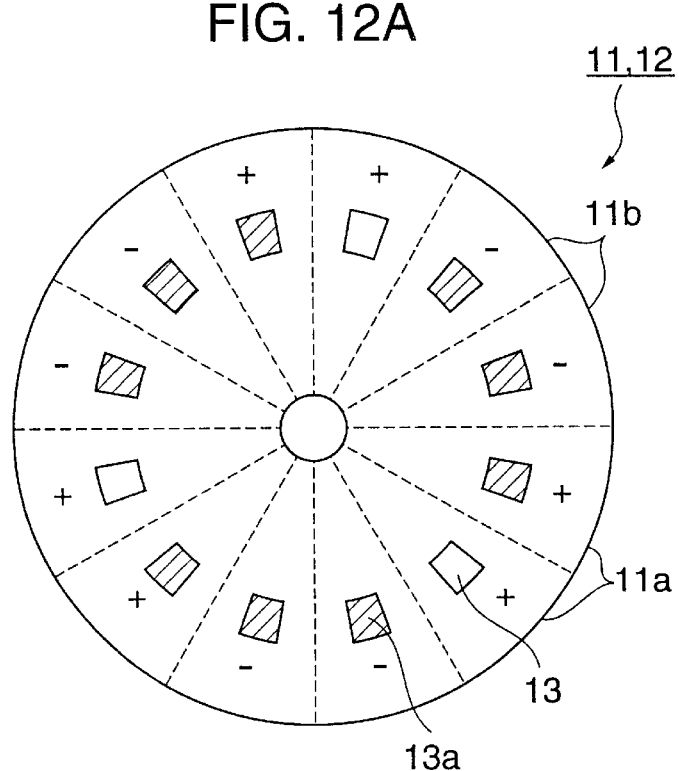
FIGS. 12A and 12B are an outline top view and an outline developed side view for explaining a constitution of a piezoelectric element used in other modified example of the ultrasonic motor.
Figure 12B:
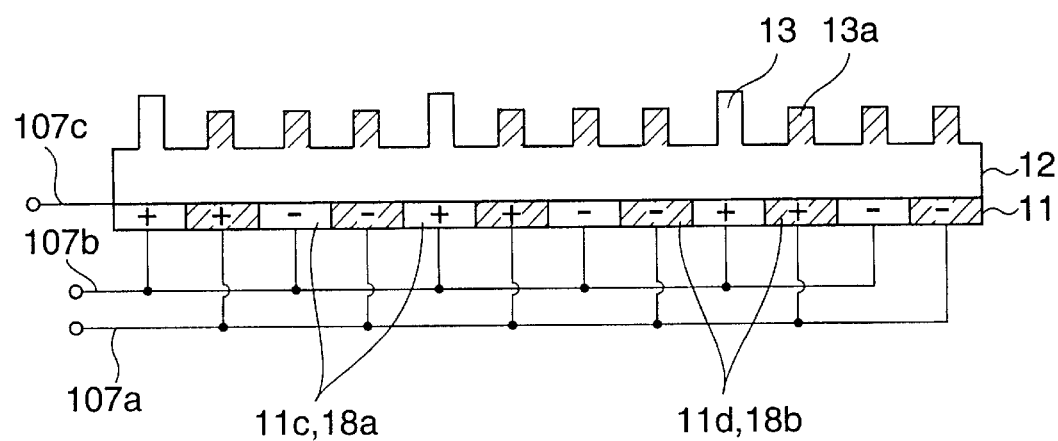

Further, as shown by FIGS. 12A and 12B, there may be constructed a constitution in which in the above-described modified example of the ultrasonic motor 1, the auxiliary projections 13a are provided to all of the polarized portions 11a and 11b which are not provided with the projections 13.
(Embodiment 4)

Figure 13A:
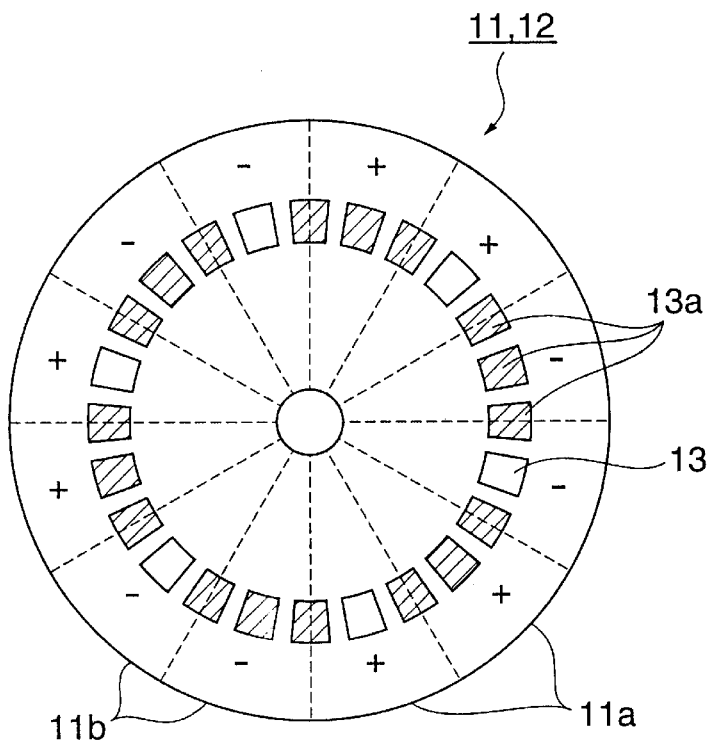
FIGS. 13A and 13B are an outline top view and an outline developed side view for explaining a constitution of a piezoelectric element used in Embodiment 4 of the invention.
Figure 13B:
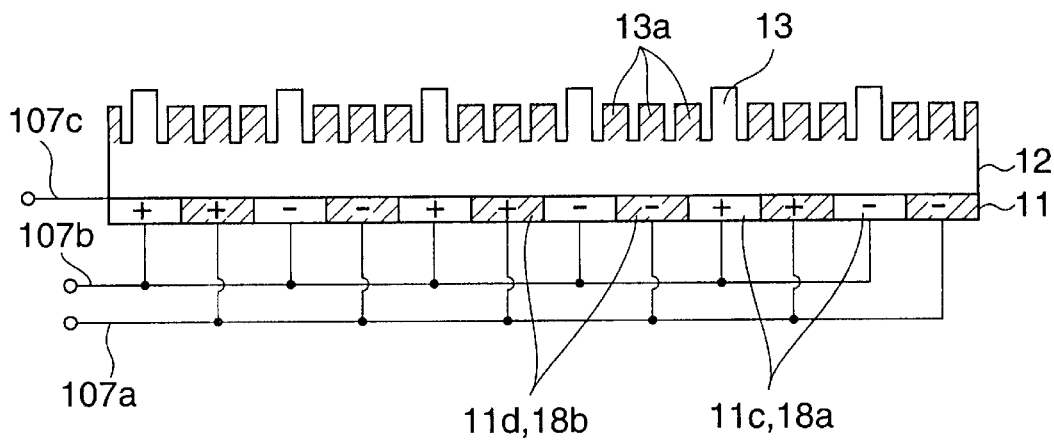

FIG. 13A is an outline top view for explaining arrangement of the projections 13 and the auxiliary projections 13a of an ultrasonic motor 4 according to Embodiment 4 of the invention and FIG. 13B is an outline developed side view for explaining arrangement and constitution of projections 13 and the auxiliary projections 13a.

The ultrasonic motor 4 is provided with a constitution substantially the same as those of the ultrasonic motor 1 and the ultrasonic motor 3 although a total structure thereof is not illustrated and constitution and arrangement of the projections provided to the oscillator 12 are changed.

Although according to the ultrasonic motor 3, described above, a single one of the auxiliary projection 13a is arranged to a single one of the polarized portion, in this case, three of the auxiliary projections 13a are provided between the projections 13 for taking out the output at equal intervals. Thereby, the projections are arranged over the peripheral direction of the piezoelectric element 11 and the oscillator 12, thereby, with respect to generated oscillation, higher uniformity can be ensured and more excellent motor characteristic is provided.
(Embodiment 5)

Figure 14A:
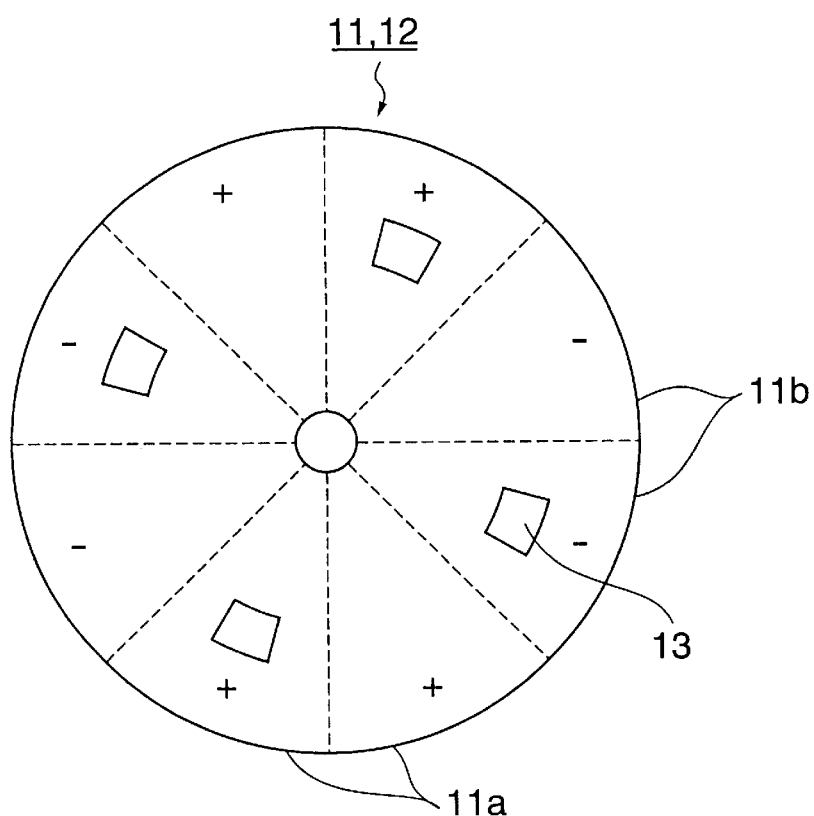
FIGS. 14A and 14B are an outline top view and an outline developed side view for explaining a constitution of a piezoelectric element used in Embodiment 5 of the invention.
Figure 14B:
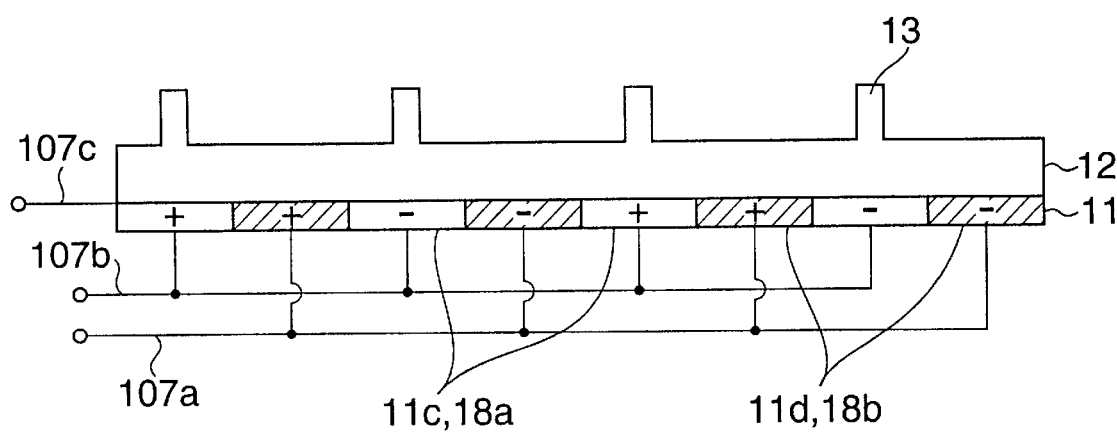

FIG. 14A is an outline top view for explaining a polarizing structure of the piezoelectric element 11 of the ultrasonic motor 5 and arrangement of the projections 13 according to Embodiment 5 of the invention.

The ultrasonic motor 5 is provided with a constitution substantially the same as that of the ultrasonic motor 1, although not illustrated and a polarizing structure of the piezoelectric element 11 and arrangement of the projections 13 are changed.

That is, in the ultrasonic motor 5, according to the piezoelectric element 11, divided portions constituted by dividing the piezoelectric element 11 into four in the circumferential direction, are polarized such that polarizing directions thereof are reverse to each other and the respective divided portion is divided equally in two. As a result, there is constructed a constitution in which a total of eight pieces of every two of the polarized portions 11a and the polarized portions 11b are arranged alternately. Further, the polarized portions form the polarized portion groups 11c and 11d similar to the ultrasonic motor 1. Further, a total of four of the projections 13 are provided to all of the polarized portions belonging to the polarized portion group 11d. In contrast to the fact that in the ultrasonic motors of Embodiment 1 through Embodiment 4, the piezoelectric element 11 is provided with 12 pieces of the polarized portions and three waves of standing waves are generated in the peripheral direction, according to the embodiment, a number of the polarized portions is eight and an oscillation mode to be generated is of two waves of standing waves in the peripheral direction. Further, in the diameter direction, one node (one node circle) is provided similar to those of Embodiment 1 through Embodiment 4.

According to the ultrasonic motor 5 having such a constitution, other than providing the ultrasonic motor driven by principle the same as that of the ultrasonic motor 1, there is constructed a structure in which the number of the divided portions is reduced and polarizing treatment is facilitated and accordingly, there can be provided the ultrasonic motor having inconsiderable restriction in fabrication and capable of being easily downsized.

Figure 15A:
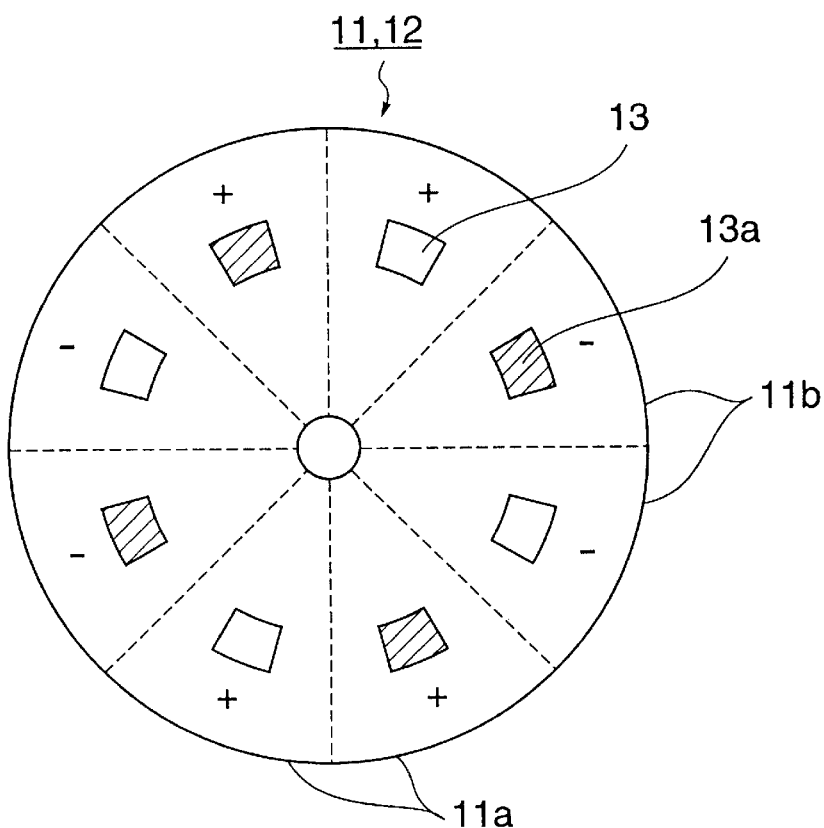
FIGS. 15A and 15B are an outline top view and an outline developed side view for explaining a constitution of a piezoelectric element used in a modified example of the ultrasonic motor.
Figure 15B:
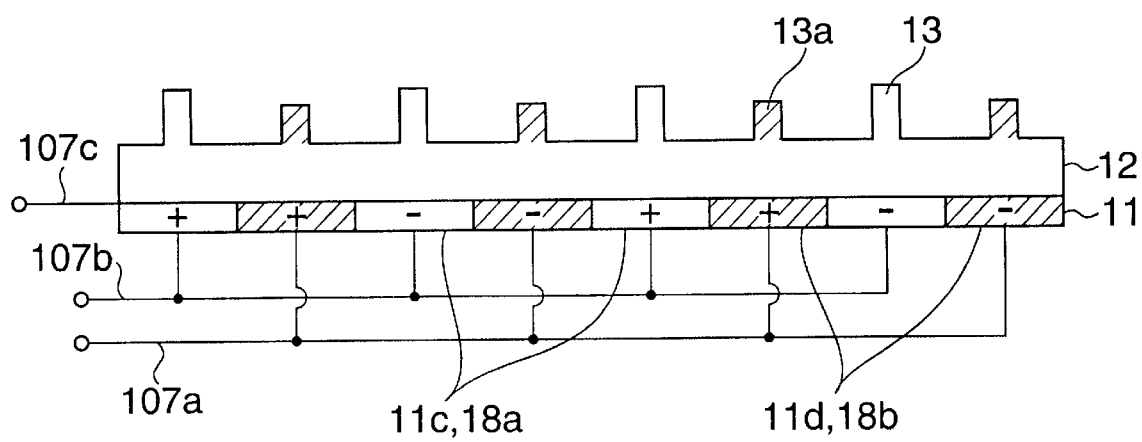

Further, also in the case of the ultrasonic motor 5, as shown by FIGS. 15A and 15B, there may be constructed a constitution in which the auxiliary projections 13a similar to those in the ultrasonic motor 2 are provided to all of the polarized portions belonging to the polarized portion group 11c.

Further, similar to Embodiment 4, with regard to positions of arranging the auxiliary projections 13a and the number of pieces, one piece of auxiliary projections 13a may not be provided to a vicinity of a central portion of the respective polarized portion but a plurality of auxiliary projections may be arranged between the projections 13 at equal intervals.
(Embodiment 6)

Next, an explanation will be given of an ultrasonic motor 6 according to Embodiment 6 of the invention in reference to FIG. 16 through FIG. 18.

Figure 16:
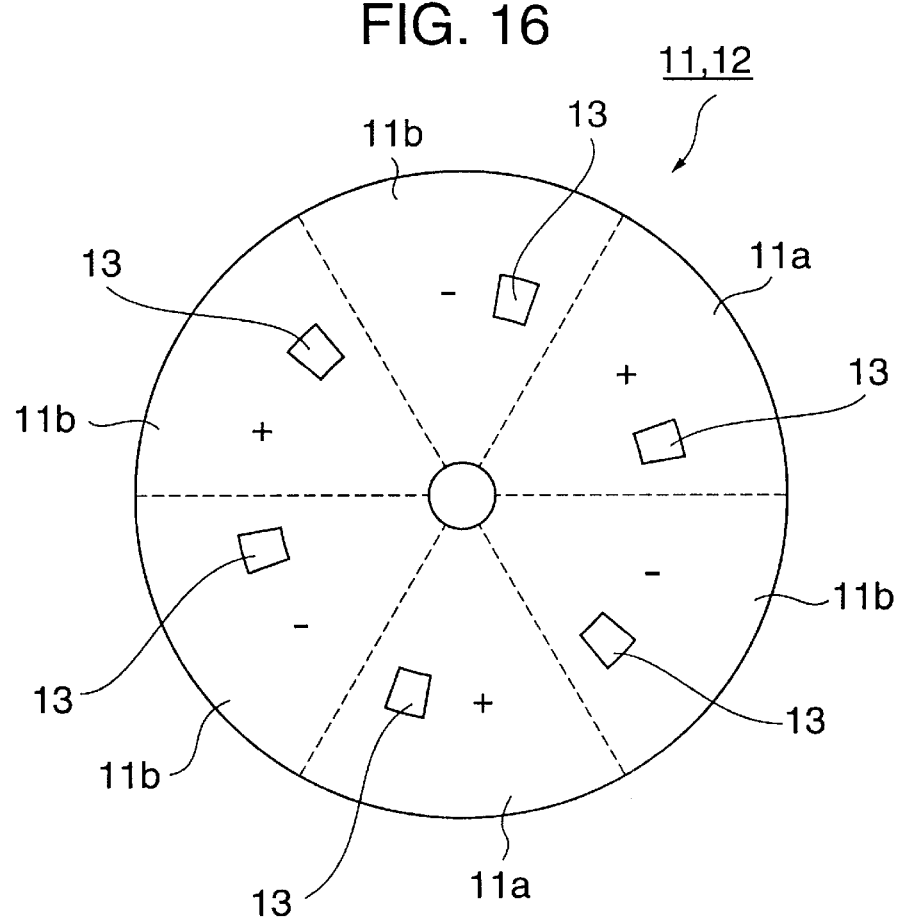
FIG. 16 is an outline top view for explaining a structure of a piezoelectric element and positions of projections used in an ultrasonic motor according to Embodiment 6 of the invention.
Figure 17:
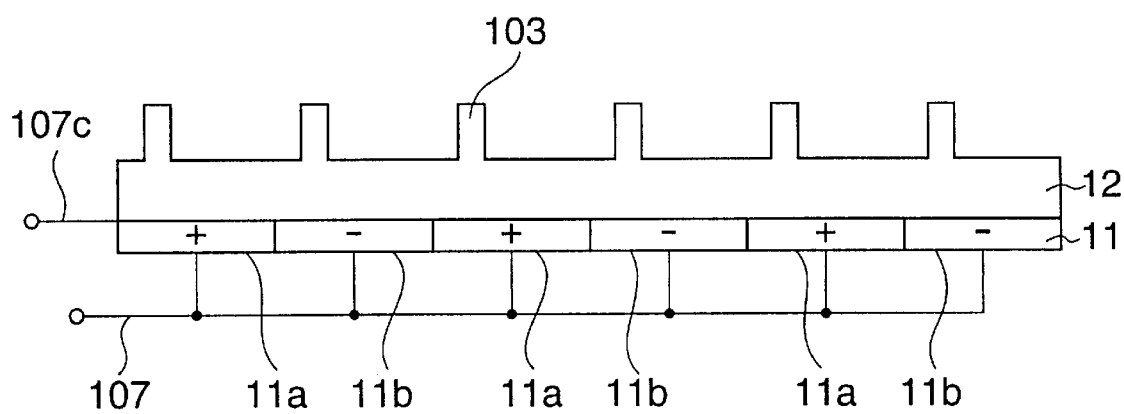
FIG. 17 is an outline developed side view of the piezoelectric element and an oscillator of the ultrasonic motor.
Figure 18:
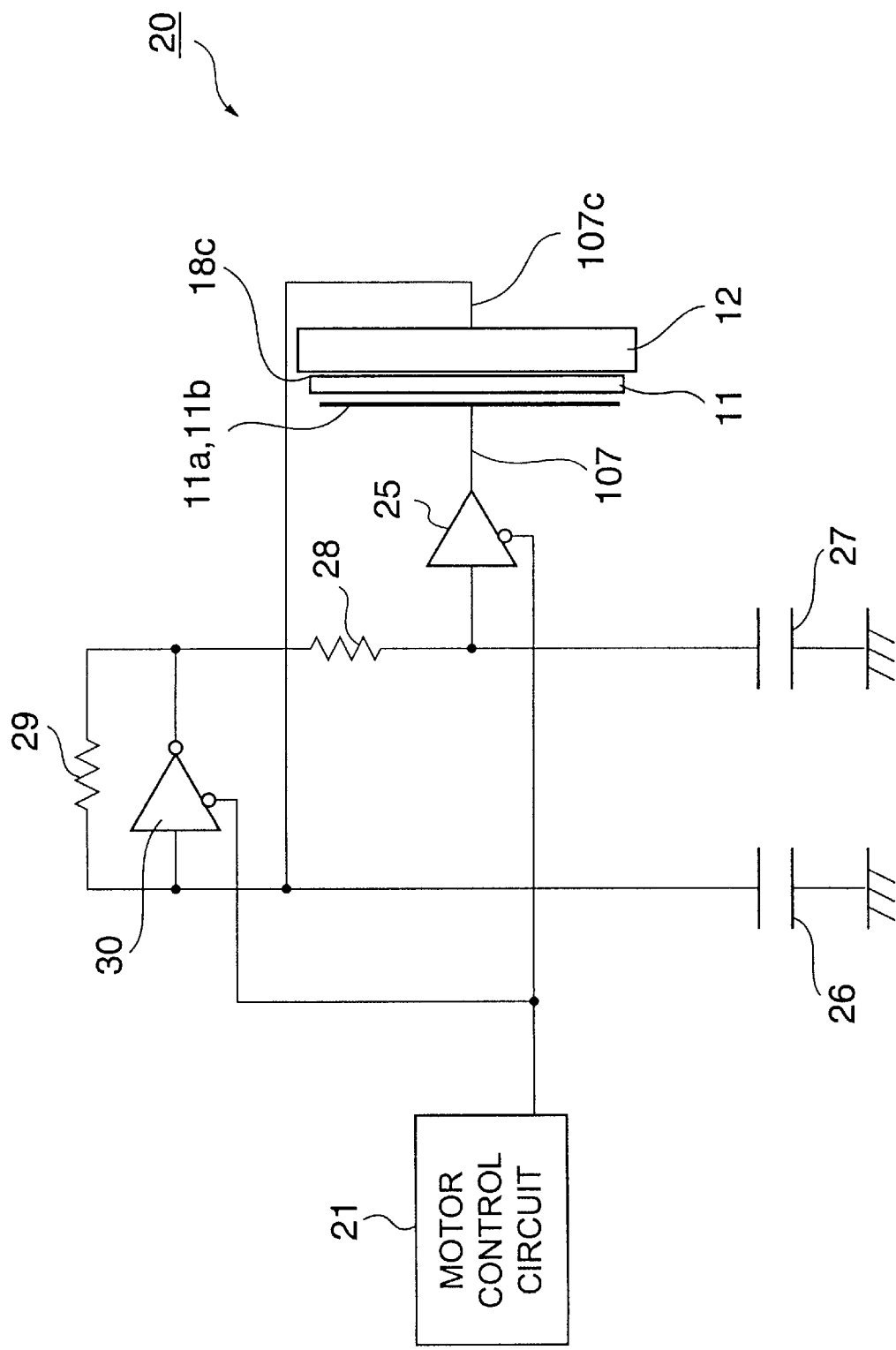
FIG. 18 is a constitution diagram of a self-excited oscillation drive circuit of the ultrasonic motor.

FIG. 16 is an outline top view for explaining a structure of the piezoelectric element 11 used in the ultrasonic motor 6 and positions of the projections 13, FIG. 17 is an outline developed side view of the piezoelectric element 11 and the oscillator 12 and FIG. 18 shows a constitution of the self-excited oscillation drive circuit 20 of the ultrasonic motor 6. The ultrasonic motor 6 is for the case used for a use of one direction rotation without changing the rotational direction. The basic constitution of the motor is the same as that of the ultrasonic motor 1 and is featured in the piezoelectric element 11 and the projection 13 of the oscillator 12. That is, the piezoelectric element 11 is constituted by 6 of polarized portions in which the polarized portions 11a subjected to the polarized treatment in the plus (+) direction and the polarized portions 11b subjected to the polarizing processing in minus (−) direction are arranged alternately over the peripheral direction. Six of the projections 13 provided to the oscillator 12, each is arranged substantially at an intermediate position between a center in the peripheral direction of the respective polarized portion and a boundary line between the polarized portions 11a and 11b.

A lead wire 107 for applying a drive signal to the piezoelectric element 11 is connected to both the polarized portions 11a and 11b on a side opposed to a face of the piezoelectric element 11 adhered to the oscillator 12 and the lead wire 107c is connected to the oscillator 12 to thereby achieve electric conduction with the side of the face of the piezoelectric element 11 adhered to the oscillator 12. That is, the polarized portion 11a and 11b of the piezoelectric element 11 are driven by being applied with the same signal.

Further, although as the self-excited oscillation drive circuit of the ultrasonic motor 6 of the use of one direction rotation, the ultrasonic motor 6 can be driven by using the circuit shown in FIG. 4, the self-excited oscillation drive circuit 20 may be constructed by a constitution shown in FIG. 18, thereby, the circuit can further be downsized and can be made inexpensive in view of the cost. That is, a portion thereof for supplying power to the piezoelectric element is simplified and is constituted only by the tri-state buffer 25 and other constitution remains unchanged. That is, the output terminal of the tri-state inverter 30 as the preamplifier, is connected to the input terminal of the tri-state buffer 25 via the limiting resistor 28. The output terminal of the tri-state buffer 25 is connected to the polarized portions 11a and 11b of the piezoelectric element 11 via the lead wire 107. The motor control circuit 21 drives/stops the ultrasonic motor by outputting an H/L signal to the control terminals of the tri-state inverter 30 as the preamplifier and the tri-state buffer 25. In this case, a standing wave generated at the piezoelectric element 11 and the oscillator 12 by self-excited oscillation is generated only at a constant position and accordingly, a direction of driving the ultrasonic motor becomes one direction.

As described above, when the rotational direction may be one direction, as mentioned above, large output similar to that in the ultrasonic motor 1 can be provided by a simpler structure.

(Embodiment 7)

Figure 19:
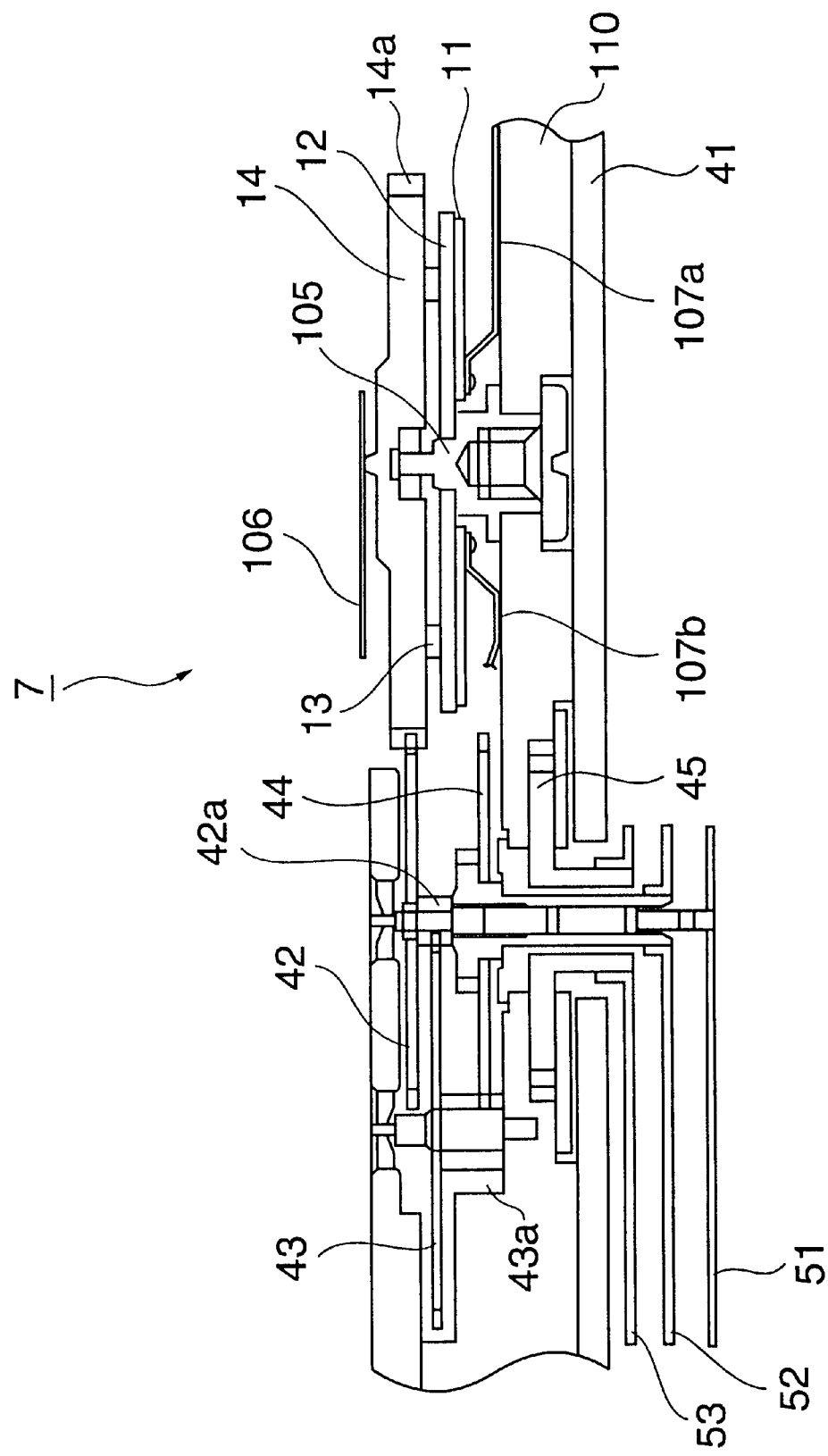
FIG. 19 is an outline sectional view for explaining an analog time piece having an ultrasonic motor according to Embodiment 7 of the invention.
Figure 20:
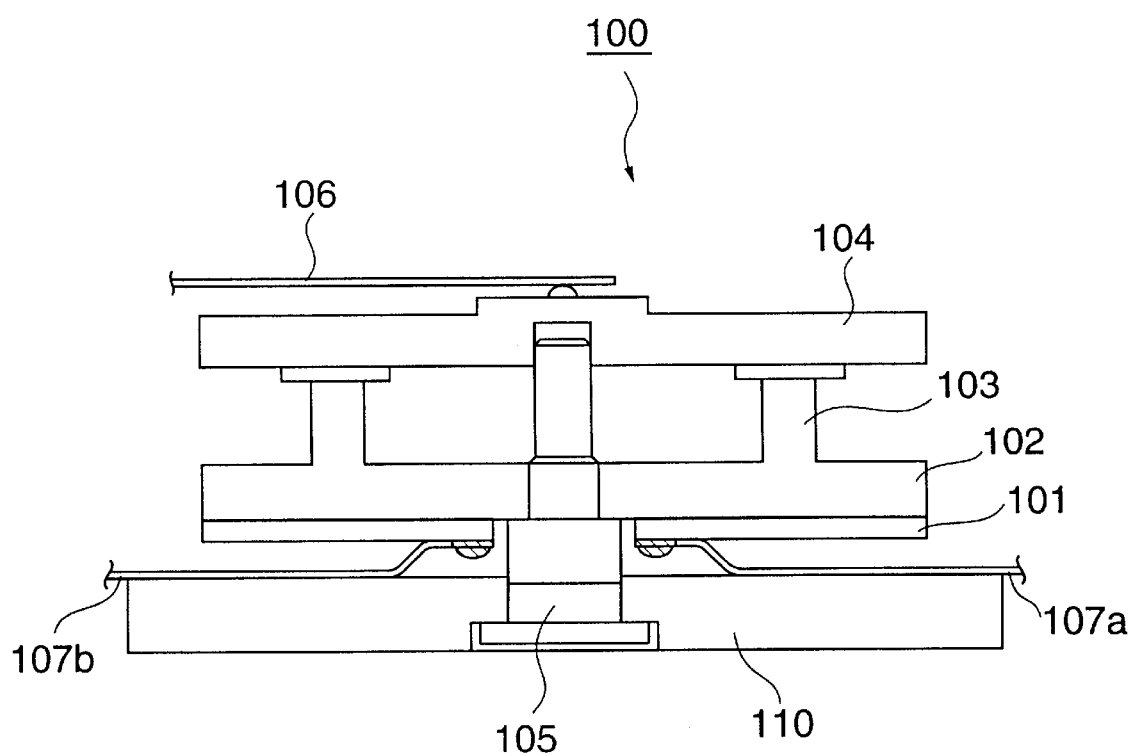
FIG. 20 is an outline sectional view-for explaining a constitution of an ultra sonic motor according to a conventional example.
Figure 21:
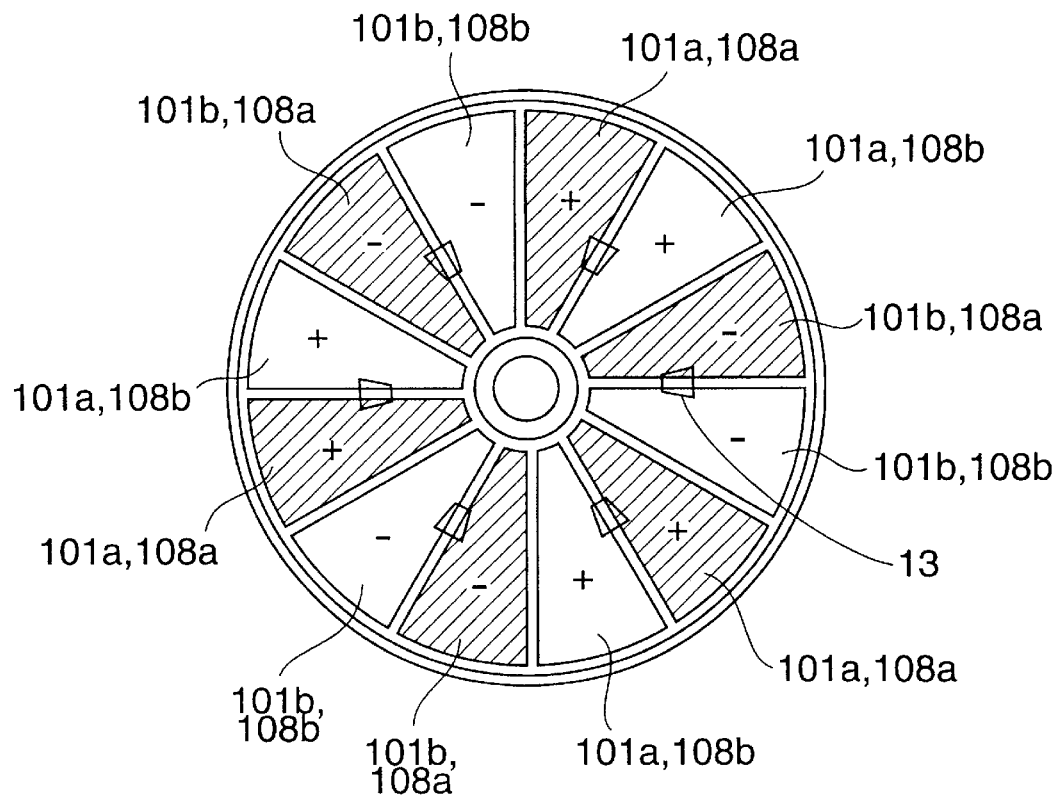
FIG. 21 is an outline top view of a piezoelectric element used in the ultrasonic motor.
Figure 22:
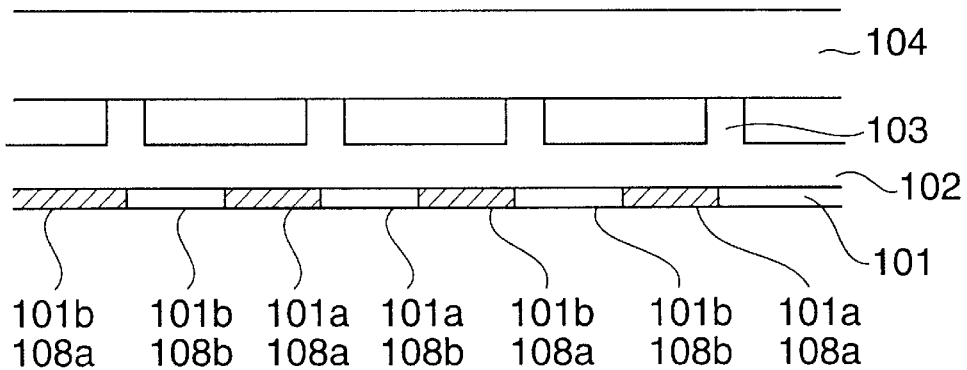
FIG. 22 is an outline developed side view for explaining arrangement of projections for taking out an output used in the ultrasonic motor.
Figure 23A:
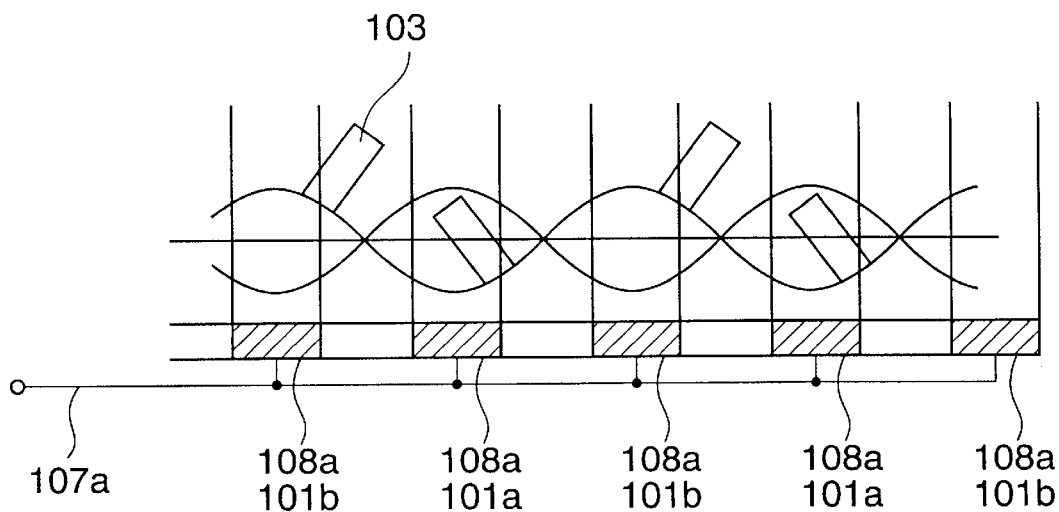
FIGS. 23A and 23B are schematic views for explaining operation of the ultrasonic motor.
Figure 23B:
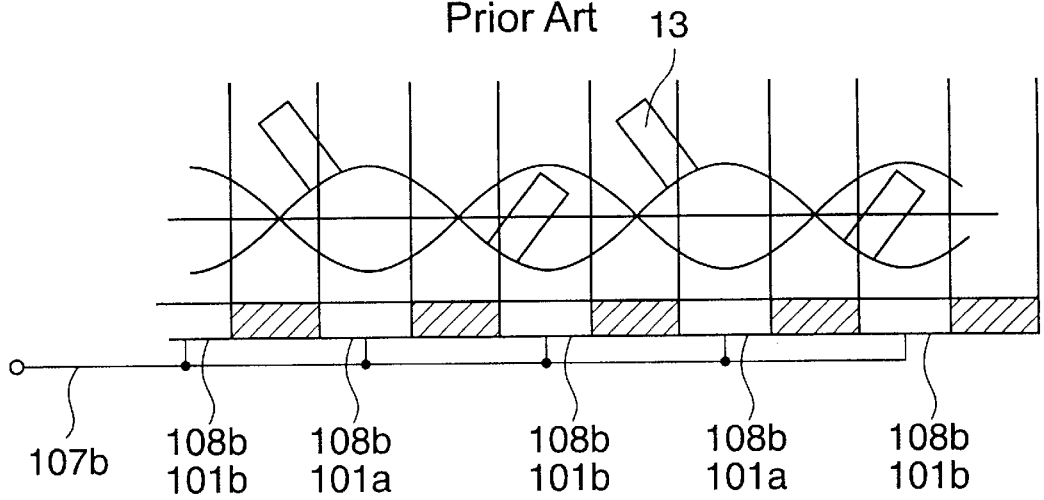

FIG. 19 is an outline sectional view showing a constitution of an analog time piece 7 having an ultrasonic motor (an electronic apparatus having ultrasonic motor) according to Embodiment 7 of the invention.

The analog time piece 7 having an ultrasonic motor, is generally constituted by the ultrasonic motor 1 fixedly supported above a main plate 110, a fourth wheel & pinion 42 in mesh with a gear 14a provided at an outer edge of the moving member 14 of the ultrasonic motor 1 and having a second hand 51 and a fourth pinion 42a at a rotating shaft thereof, a third wheel & pinion 43 in mesh with the fourth wheel & pinion 42a, a minute driving wheel 44 in mesh with a third pinion 43a provided at the rotating shaft of the third wheel & pinion 43 and having a minute hand 52 at a rotating shaft thereof, and an hour wheel 45 and an hour hand 53 transmitting power via a minute wheel (not illustrated) in mesh with a minute pinion (not illustrated) provided at the minute driving wheel 44.

In this case, numbers of teeth of the third wheel & pinion 43 and the minute driving wheel 44 are set such that the rotational speed of the minute hand becomes 1/60 of the rotational speed of the fourthwheel & pinion 42, that is, the secondhand, further, a number of teeth of the hour wheel 45 is set such that the rotational speed of the hour hand becomes 1/720 of the fourth wheel & pinion 42 via the minute wheel, not illustrated.

According to the analog time piece 7 having the ultrasonic motor in such a constitution, when the moving member 14 is rotated by driving the ultrasonic motor 1, the fourth wheel & pinion 42 and the second hand 51 are rotated to follow the moving member 14 and display second.

Further, the minute driving wheel 44 is rotated to follow the fourth wheel & pinion 42 via the third wheel & pinion by a speed reduction ratio of 1/60.

Further, the hour wheel 45 is rotated to follow the fourth wheel & pinion 42 via the minute wheel by a speed reduction ratio of 1/720 and displays hour.

In this case, the analog time piece 7 having the ultrasonic motor uses the ultrasonic motor 1 having larger output per unit volume than the conventional time piece and accordingly, the size can be reduced. Further, a constitution heavier than the conventional constitution can be driven and accordingly, other than time display, calendar display of year, month, date or the like, remaining amount of battery, environmental information of azimuth or the like, a mechanism and the like are displayed to thereby enable to constitute further multiple function formation.

Further, according to display of time information, other than display carried by the plurality of train wheels and hands as mentioned above, hands or indicators may directly be attached in the axis direction of the moving member 14.

Further, as the ultrasonic motor used in the analog time piece 7 having the ultrasonic motor, naturally, the ultrasonic motors 2, 3, 4, 5 and 6 are applicable thereto.

Further, electronic apparatus to which the ultrasonic motor according to the invention is applied, is not limited to an analog time piece but, naturally the ultrasonic motor is applicable to measuring instrument, camera, printer, printing machine, machine tool, robot, moving apparatus, storing apparatus and so on.

As has been described, according to the present invention, there is provided the ultrasonic motor driven by generating standing wave oscillation at a piezoelectric element by inputting alternating voltage to all of polarized portions provided to the piezoelectric element and divided in the circumferential direction, capable of switching a direction of driving the ultrasonic motor by selecting whether a phase of the alternating voltage inputted to at least one polarized portion of the polarized portions is changed by 180° or not. That is, by changing a relative relationship between the piezoelectric element and the sanding wave oscillation generated at the piezoelectric element, the drive direction can be switched regardless of the fact that the drive voltage is applied to all of the polarized portions provided to the piezoelectric element.

That is, there can be provided the ultrasonic motor capable of switching the rotational direction and at the same time, having larger output per unit volume since flexing oscillation can be generated by strong exciting force because all of the polarized portions of the piezoelectric element are used for driving.

Therefore, its use is further widened such that an apparatus having the ultrasonic motor can be downsized.

What is claimed is:

1. An ultrasonic motor comprising:
an oscillator having a circular disk shaped piezoelectric element divided into a plurality of polarized segments in a circumferential direction thereof, polarities of adjacent polarized segments being the same and polarities of adjacent pairs of the polarized segments being reverse to each other and including a first polarized segment group comprising alternate ones of the polarized segments and a second polarized segment group comprising polarized segments not belonging to the first polarized segment group, so that a standing wave is generated in the piezoelectric element by simultaneously inputting a voltage to both of the polarized segment groups;
a plurality of projections provided on the oscillator and disposed circumferentially about the oscillator on faces of polarized segments adjacent projections being separated by an odd number of segments;
a moving member in contact with the projections and driven by the projections to undergo rotary movement when the standing wave is generated in the piezoelectric element; and
a phase switch to switch a direction of driving the moving member by selecting whether phases of alternating voltage inputted to the first polarized segment group and the second polarized segment group are the same phase or have a phase difference of 180 degrees.

2. An ultrasonic motor according to claim 1; wherein the projections are located at a position in a diameter direction of the piezoelectric element at which an oscillation amplitude between a center of the piezoelectric element and a node circle of oscillation of the standing wave is maximized when an alternating power is supplied to both the first polarized segment group and the second polarized segment group and a position of the projections in a circumferential direction of the piezoelectric element is at a center in the circumferential direction of the polarized segments.

3. An ultrasonic motor according to claim 1; further comprising auxiliary projections disposed adjacent the projections and being lower than the projections so that the auxiliary projections do not contact the moving member.

4. An ultrasonic motor according to claim 3; wherein the oscillator further comprises an elastic member in contact with the piezoelectric element and having a circular disk shape, and the projections and the auxiliary projections are formed integrally on a surface of the elastic member.

5. An ultrasonic motor according to claim 1; further comprising a self-excited oscillation drive circuit comprising a first non-inverting power amplifier and a first inverting power amplifier, output terminals of the first non-inverting power amplifier and the first inverting power amplifier being connected to the first polarized segment group, a second power amplifier having an output terminal connected to the second polarized segment group, and a motor control circuit for starting or stopping the motor and switching a rotational direction thereof by bringing the first non-inverting power amplifier, the first inverting power amplifier and the second power amplifier respectively into an active state or a nonactive state.

6. An ultrasonic motor according to claim 5; wherein the self-excited oscillation drive circuit further comprises a condenser connected in series with the polarized segments; wherein the motor is driven by subjecting the piezoelectric element to self-excited oscillation by forming an LC resonating circuit by the condenser and an inductance of the piezoelectric element when brought into a mechanical resonating state.

7. An electronic apparatus having a drive source and a movable member driven by the drive source; wherein the drive source comprises the ultrasonic motor according to claim 1.

8. An ultrasonic motor comprising:
an oscillator having a piezoelectric element in a circular disk shape and being divided by a multiple of two into a plurality of polarized segments in a circumferential direction thereof, polarities of adjacent pairs of the polarized segments being reversed to each other, to generate a standing wave when a voltage is simultaneously supplied to all of the polarized segments;
a plurality of projections provided on the oscillator and disposed circumferentially about the oscillator on faces of the polarized segments of the piezoelectric element;
a moving member in contact with the projections and driven by the projections to undergo rotary movement when the standing wave is generated in the piezoelectric element;
a power amplifier having an output terminal connected to the plurality of polarized segments; and
a self-excited oscillation drive circuit comprising a motor control circuit for starting or stopping the motor by bringing the power amplifier into an active state or a nonactive state.

9. An electronic apparatus having a drive source and a movable member driven by the drive source; wherein the drive source comprises the ultrasonic motor according to claim 6.

10. An ultrasonic motor according to claim 6; wherein the projections are not located at boundaries between adjacent polarized segments of the piezoelectric element.

11. An ultrasonic motor comprising: a piezoelectric element divided into a plurality of polarized segments each segment being polarized in a thickness direction of the piezoelectric element, pairs of adjacent segments being polarized in the same direction and adjacent pairs of segments being polarized in opposite directions, the plurality of polarized segments forming first and second polarized segment groups each comprising alternating polarized segments, so that upon application of an alternating voltage to both the first and second polarized segment groups a standing wave is generated by the piezoelectric element; a movable member driven by the piezoelectric element; and a driving circuit for supplying the alternating voltage to the piezoelectric element to generate the standing wave, and for selectively varying the phase of the alternating voltage applied to one of the first and second polarized segment groups to change the direction of the motor.

12. An ultrasonic motor according to claim 11; further comprising a vibrating body disposed on the piezoelectric element and having a plurality of projections extending from a surface opposite the piezoelectric element, the projections being in contact with the movable member.

13. An ultrasonic motor according to claim 11; wherein the piezoelectric element has a circular disc shape and the polarized segments extend about a circumference thereof.

14. An ultrasonic motor according to claim 13; wherein the number of polarized segments disposed about the circumference of the piezoelectric element comprises a multiple of four.

15. An ultrasonic motor according to claim 13; wherein the projections are located at a position in a diameter direction of the piezoelectric element at which an oscillation amplitude between a center of the piezoelectric element and a node circle of oscillation of the standing wave is maximized when the alternating voltage is supplied to both the first polarized segment group and the second polarized segment group.

16. An ultrasonic motor according to claim 13; wherein a position of the projections in a circumferential direction of the piezoelectric element is at a center in the circumferential direction of the polarized segments.

17. An ultrasonic motor according to claim 13; wherein the projections are not disposed on boundaries between adjacent polarized segments.

18. An ultrasonic motor according to claim 11; further comprising auxiliary projections disposed adjacent the projections and being lower than the projections so that the auxiliary projections do not contact the moving member.

19. An ultrasonic motor according to claim 11; wherein the oscillator further comprises an elastic member in contact with the piezoelectric element and having a circular disk shape, and the projections are formed integrally on a surface of the elastic member.

20. An ultrasonic motor according to claim 11; further comprising a self-excited oscillation drive circuit comprising a first non-inverting power amplifier and a first inverting power amplifier, output terminals of the first non-inverting power amplifier and the first inverting power amplifier being connected to the first polarized segment group, a second power amplifier having an output terminal connected to the second polarized segment group, and a motor control circuit for starting or stopping the motor and switching a rotational direction thereof by bringing the first non-inverting power amplifier, the first inverting power amplifier and the second power amplifier respectively into an active state or a non-active state.

* * * * *